(12) United States Patent
Bernier

(10) Patent No.: US 7,619,626 B2
(45) Date of Patent: Nov. 17, 2009

(54) MAPPING IMAGES FROM ONE OR MORE SOURCES INTO AN IMAGE FOR DISPLAY

(75) Inventor: Kenneth L. Bernier, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/379,409

(22) Filed: Mar. 1, 2003

(65) Prior Publication Data

US 2004/0169663 A1 Sep. 2, 2004

(51) Int. Cl.
*G06T 15/10* (2006.01)
*G09G 5/00* (2006.01)

(52) U.S. Cl. .................. 345/427; 345/629; 345/630; 345/632; 345/633; 345/634; 345/639; 345/640

(58) Field of Classification Search ......... 345/629–641, 345/427
See application file for complete search history.

(56) References Cited

U.S. PATENT DOCUMENTS

| | | | | |
|---|---|---|---|---|
| 4,805,015 A * | 2/1989 | Copeland | ..................... | 348/48 |
| 5,317,394 A | 5/1994 | Hale et al. | | |
| 5,325,472 A * | 6/1994 | Horiuchi et al. | ............. | 345/427 |
| 5,495,576 A * | 2/1996 | Ritchey | ..................... | 345/420 |
| 5,561,756 A * | 10/1996 | Miller et al. | ................ | 715/848 |
| 5,805,341 A * | 9/1998 | Kuba | .......................... | 359/630 |
| 5,904,729 A * | 5/1999 | Ruzicka | ....................... | 701/300 |
| 5,935,190 A * | 8/1999 | Davis et al. | ................. | 701/119 |
| 6,157,747 A * | 12/2000 | Szeliski et al. | ............. | 382/284 |
| 6,195,455 B1 * | 2/2001 | Mack et al. | ................. | 382/154 |
| 6,400,364 B1 * | 6/2002 | Akisada et al. | ............. | 345/427 |
| 6,411,266 B1 * | 6/2002 | Maguire, Jr. | ................... | 345/8 |
| 6,414,712 B1 * | 7/2002 | Wanielik et al. | ............ | 348/118 |
| 6,525,731 B1 * | 2/2003 | Suits et al. | ................... | 345/427 |
| 6,567,086 B1 * | 5/2003 | Hashimoto | .................. | 345/427 |

(Continued)

FOREIGN PATENT DOCUMENTS

WO WO 9942854 A1 * 8/1999

OTHER PUBLICATIONS

"Synthetic Vision as an Integrated Element of an Enhanced Vision System", Jennings, Apr., 2002.*

(Continued)

*Primary Examiner*—Ulka Chauhan
*Assistant Examiner*—Jeffrey J Chow
(74) *Attorney, Agent, or Firm*—Alston & Bird LLP

(57) ABSTRACT

The present invention provides systems and methods that provide images of an environment to the viewpoint of a display. The systems and methods define a mapping surface at a distance from the image source and display that approximates the environment within the field of view of the image source. The system methods define a model that relates the different geometries of the image source, display, and mapping surface to each other. Using the model and the mapping surface, the systems and methods tile images from the image source, correlate the images to the display, and display the images. In instants where two image sources have overlapping fields of view on the mapping surface, the systems and methods overlap and stitch the images to form a mosaic image. If two overlapping image sources each have images with unique characteristics, the systems and methods fuse the images into a composite image.

32 Claims, 18 Drawing Sheets

U.S. PATENT DOCUMENTS

| | | | |
|---|---|---|---|
| 6,690,338 B1* | 2/2004 | Maguire, Jr. | 345/8 |
| 6,791,540 B1* | 9/2004 | Baumberg | 345/419 |
| 6,890,263 B2* | 5/2005 | Hiraoka et al. | 463/32 |
| 6,897,858 B1* | 5/2005 | Hashimoto et al. | 345/419 |
| 6,975,756 B1* | 12/2005 | Slabaugh et al. | 382/154 |
| 7,126,630 B1* | 10/2006 | Lee et al. | 348/218.1 |
| 2002/0044152 A1* | 4/2002 | Abbott et al. | 345/629 |
| 2002/0080143 A1* | 6/2002 | Morgan et al. | 345/581 |
| 2002/0122117 A1* | 9/2002 | Nakagawa et al. | 348/218 |
| 2002/0149585 A1* | 10/2002 | Kacyra et al. | 345/428 |
| 2003/0026469 A1* | 2/2003 | Kreang-Arekul et al. | 382/132 |
| 2003/0063192 A1* | 4/2003 | Dodd et al. | 348/143 |
| 2003/0108223 A1* | 6/2003 | Prokoski | 382/115 |
| 2003/0113006 A1* | 6/2003 | Berestov | 382/131 |
| 2003/0120391 A1* | 6/2003 | Saito | 700/264 |
| 2004/0021917 A1* | 2/2004 | Plesniak et al. | 359/9 |
| 2004/0051711 A1* | 3/2004 | Dimsdale et al. | 345/419 |
| 2004/0095999 A1* | 5/2004 | Piehl et al. | 375/240.16 |
| 2004/0105573 A1* | 6/2004 | Neumann et al. | 382/103 |
| 2004/0105579 A1* | 6/2004 | Ishii et al. | 382/154 |
| 2004/0125103 A1* | 7/2004 | Kaufman et al. | 345/419 |
| 2004/0247174 A1* | 12/2004 | Lyons et al. | 382/154 |
| 2004/0257382 A1* | 12/2004 | van der Zijpp | 345/629 |
| 2006/0134001 A1* | 6/2006 | Frangioni | 424/9.6 |
| 2006/0208193 A1* | 9/2006 | Bodkin | 250/353 |
| 2006/0238536 A1* | 10/2006 | Katayama et al. | 345/427 |

OTHER PUBLICATIONS

"Calibration For Augmented Reality Experimental Testbeds", Summers, 1999.*

"Real-Time Texture Synthesis by Patch-Based Sampling", Liang, Jul. 2001.*

Jennings et al., "Synthetic Vision as an Integrated Element of an Enhanced Vision System", Apr. 1, 2002.*

Debevec et al., "Modeling and Rendering Architecture from Photographs: A hybrid geometry- and image-based approach", SIGGRAPH 96 conference preceedings, pp. 1-10.*

Jennings et al., "*Synthetic Vision as an Integrated Element of an Enhanced Vision System*," presented Apr. 1, 2002 at SPIE AeroSense Conference 2002 in Orlando, Florida.

Guell, Jeff; "*FLILO (Flying Infrared for Low-level Operations) an Enhanced Vision System*," presented Apr. 2000 at SPIE AeroSense Conference 2000 in Orlando, Florida.

* cited by examiner

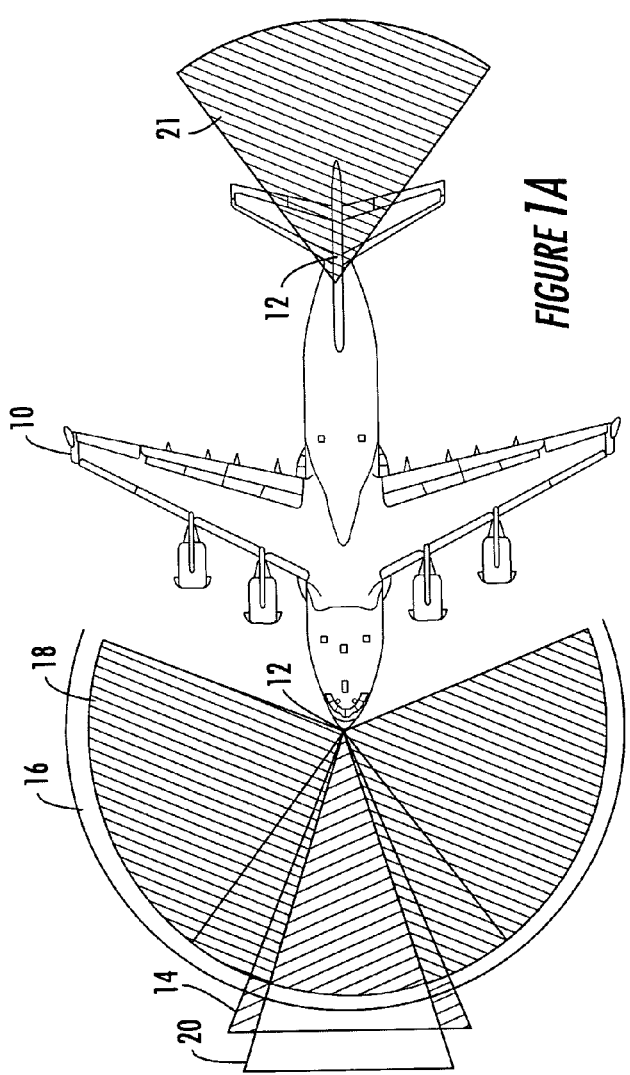
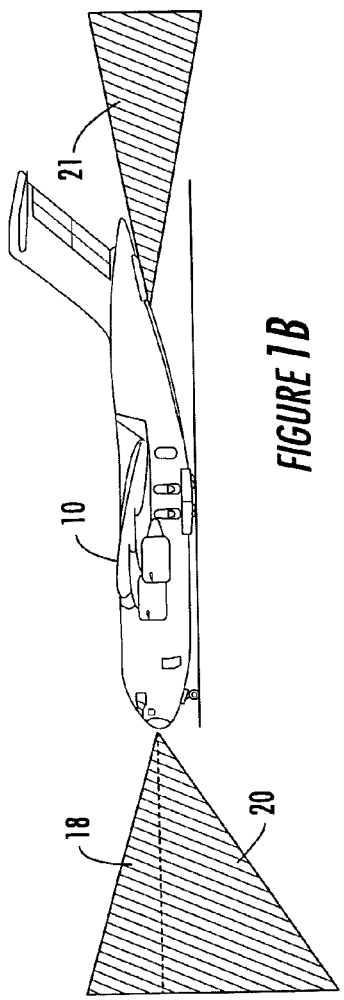
FIGURE 1A
FIGURE 1B

MAPPING IMAGES FROM ONE OR MORE SOURCES INTO AN IMAGE FOR DISPLAY

BACKGROUND OF THE INVENTION

1. Field of Invention

The present invention relates to vision display systems used to provide a user with a visual display of a field of interest, and more particularly to systems and methods that combine images from a plurality of sources to provide a coherent view of a field of interest.

2. Description of Related Art

Despite the advent of many flight navigational aids, one of the most important tools for navigation of aircraft remains visual navigation. Many of today's aircrafts include various safety features such as on board radar, ground proximity warning systems, etc. that provide a pilot with added information about the airspace surrounding the aircraft. These systems are a tremendous resource to aid the pilot in obtaining better situational awareness during flight, by allowing the pilot to further interpret what he or she is visually observing. However, there are instances where these various instruments become the pilot's only resource for information because the pilot's vision is hindered.

Visual hindrances may be due to bad weather, such as fog, snow, or rain, or they may be due to the time of day, such as night, dawn, or dusk. Further, some visual hindrances are due to the field of view limitations of the aircraft itself. Many aircraft cockpits have a field of view that is typically limited to a forward facing area that does not provide the pilot with adequate visualization to the sides and rear of the aircraft and also does not provide adequate vertical visualization above and below the aircraft.

Obstructed vision is an important safety concern in aircraft navigation, and there has been considerable effort devoted to providing systems that increase or enhance a pilot's view from the cockpit. Systems have been developed that include the use of one or more sensors that are located on the aircraft. The sensors are directed toward a selected field of view and provide images to a display system in the cockpit, where they are, in turn, displayed to the pilot. The sensors may be video cameras, infrared cameras, radar, etc. The systems allow the pilot to choose the types of images to view. For example, in nighttime flight or fog conditions, the pilot may opt to view images from the infrared and radar sensors, while under clear conditions, the pilot may use video camera feeds.

One such system is disclosed in U.S. Pat. No. 5,317,394 to Hale et al., which is incorporated herein by reference. In this system, sensors are positioned on the exterior of the aircraft such that adjacent sensors have overlapped fields of view. Images from these various sensors are provided to a display system in the aircraft, where they are displayed to the pilot. The images are displayed in an overlapped configuration so as to provide a composite or mosaic image.

A more advanced system is disclosed in U.S. patent application Ser. No. 09/608,234, entitled: Exterior Aircraft Vision System Using a Helmet-Mounted Display, which is incorporated herein by reference. The Ser. No. 09/608,234 application discloses a system that includes a helmet-mounted display for displaying images from various sensors located on the aircraft. Importantly, this system includes a helmet-tracking device that tracks movement of the pilot's head in order to determine the pilot's current line of sight (LOV) and field of view (FOV). Using this directional information, the system retrieves image data from the sensors that represent the field of view in which the pilot is staring and displays this image on the helmet display. The image is updated as the pilot turns his head to different lines of sight.

In general, these and other conventional systems provide fairly accurate visual images to the pilot, and thereby increase flight safety. However, there are some limitations to these systems that can cause the images provided to the pilot to either be less accurate or include anomalies that may distract the pilot's view. For example, one issue relates to the spacing of sensors relative to each other and relative to the pilot's position or in the case of stored synthetic data, the difference in perspective between the synthetic data and the other sensors and pilot's position. This physical distance between the sources relative to each other and the cockpit may cause a skewing of the images provided to the pilot. Specifically, the distance creates a visual skewing in the images referred to as parallax. Parallax is an apparent change in the direction of an object caused by a change in observational position that provides a new line of sight. In these conventional systems, the sensor or sensors and/or synthetic data sources each have a different line of sight with regard to a scene of view from that of the pilot. As such, when viewing the images from the sensor point of view, the pilot is not provided with an accurate representation of the location of the object relative to his position in the aircraft in their overlapping field of view.

Another issue relates to tiling of several images together to create a composite image. In many conventional systems, images from adjacent cameras are displayed adjacent to each other. The edges of the two images appear as visual seams in the display. These seams disrupt viewing of the composite image and can make it harder for the pilot to view the image as a whole. To correct this problem, some prior art systems overlap the edges of adjacent images in an attempt to blend the images together. While this technique is an improvement over the conventional technique of abutting adjacent images, there may still be perceived discontinuity between the images.

A further issue relates to the limitations of a particular type of sensor to provide the best imaging for a given situation. For example, in twilight conditions, a video camera will still provide a discernable visual image, but the image will be degraded in detail due to the low light or obstructed conditions. Further, an infrared sensor will provide imaging based on heat sensing, but the image from an infrared sensor will not have the benefit of the ambient light still available at twilight. In many conventional systems, the pilot must select between these images, instead having an image available that incorporates the advantages of both sensors. As such, the pilot does not have the best images available for viewing.

SUMMARY OF THE INVENTION

The present invention provides systems and methods for use in enhanced vision displays. The systems and methods of the present invention receive image data from a plurality of sensors located at different positions on a vehicle or in an area of interest. The system may also receive synthetic image data from a database source, such as a terrain database. The systems and methods assimilate the images from each sensor/source into a composite or mosaic image. The systems and methods of the present invention detect the current line of sight of the user of the system. Based on this line of sight (LOS), the systems and methods display and image to the user representing the user's current field of view (FOV).

The systems and methods of the present invention reduce issues with regard to parallax in the displayed images. Specifically, the systems and methods of the present invention create one or more artificial mapping surfaces at a selected distance in front of the vehicle or point of interest. The artificial mapping surface allows the various images from the different sources to be correlated by a common frame of reference, with all of the images from each source being projected onto the mapping surface in the form of a tile that represents the desired surface area coverage. The mapping surface creates a frame of reference for correlating the difference in line of sight to an object of interest between the observer and the sources due to the distance separation between the observer and the sources.

Further, the sources, display, and mapping surface all have different coordinate systems. The systems and methods of the present invention create a common or primary coordinate system and transform the images from each of these components to the common or primary coordinate system. This, in turn, allows the systems and methods of the present invention to correlate the images from the various sources and provide them to the user in the viewer's frame of reference to thereby reduce and possibly eliminate parallax.

In addition to correcting for parallax, the systems and methods of the present invention also provide improved methods for stitching distributed aperture images together into a seamless mosaic. The systems and methods of the present invention overlap the edges of tile images received from the sources of the same type that are taken of adjacent or overlapping fields of view. In the overlapped region between the two tile images, the systems and methods of the present invention define blend zones that consist of inner and outer edges. In the blend zones, the systems and methods of the present invention alter the intensity of individual pixels of each tile image so as to blend the two tile images together at the blend zones. The pixels of the left image in the blend zone are tapered from an intensity value of one (1) for the pixels adjacent to the left edge of the blend zone to an intensity value of zero (0) for the pixels adjacent to the right edge of the blend zone. In an opposite manner, the pixels of the right image in the blend zone are tapered from an intensity value of zero (0) for the pixels adjacent to the left edge of the blend zone to an intensity value of one (1) for the pixels adjacent to the right edge of the blend zone. This alteration of pixel intensity values in the blend zone provides an enhanced stitch between the two images. Top and bottom stitching is performed in the same manner.

The systems and methods of the present invention also provide a method for overlaying or fusing images from different types of sources. Specifically, the system of the present invention may include two different types of sources having either the same or overlapped fields of view. The sources provide different images of the same field of view; each source having associated advantages and disadvantages. For example, one source could be a video camera that provides images that may be affected by the amount of light or visibility and the other source may be an infrared sensor that provides images based on heat sensing. The systems and methods of the present invention provide a method for overlaying or fusing the images from these sources together to provide an enhanced image.

The systems and methods include two alternate methods for fusing the images. In the first alternative, the systems and methods of the present invention assign a percentage value to each tile image with regard to intensity. For example, one tile image may be defined with a 30% intensity and the other a 70% intensity. The images are then summed together in this intensity percentage ratio, thereby providing the user with the benefit of both images. In the second alterative, each tile image is displayed based on its content. For example, given a visible and an infrared image covering similar fields of view, the images can be combined at pixel level, where priority can be given to the infrared image based upon its pixel intensity. In this case, if the infrared pixel is at 75% of maximum, then the resulting pixel would be composed from 75% of the IR pixel intensity and 25% visible pixel intensity.

The systems and methods of the present invention further include methods for reducing the number of anomalies in a given displayed image. The systems and methods of the present invention evaluate the intensity value associated with each pixel in a tile image. If a pixel or a series of pixels have intensity values that are excessive compared to neighboring pixels, the systems and methods of the present invention may decrease their intensity based on an average intensity value from neighboring pixels.

BRIEF DESCRIPTION OF THE DRAWINGS

Having thus described the invention in general terms, reference will now be made to the accompanying drawings, which are not necessarily drawn to scale, and wherein:

FIGS. 1A and 1B illustrate top and side views of an aircraft within which the systems and methods of the present invention may be implemented.

Figure 2A:
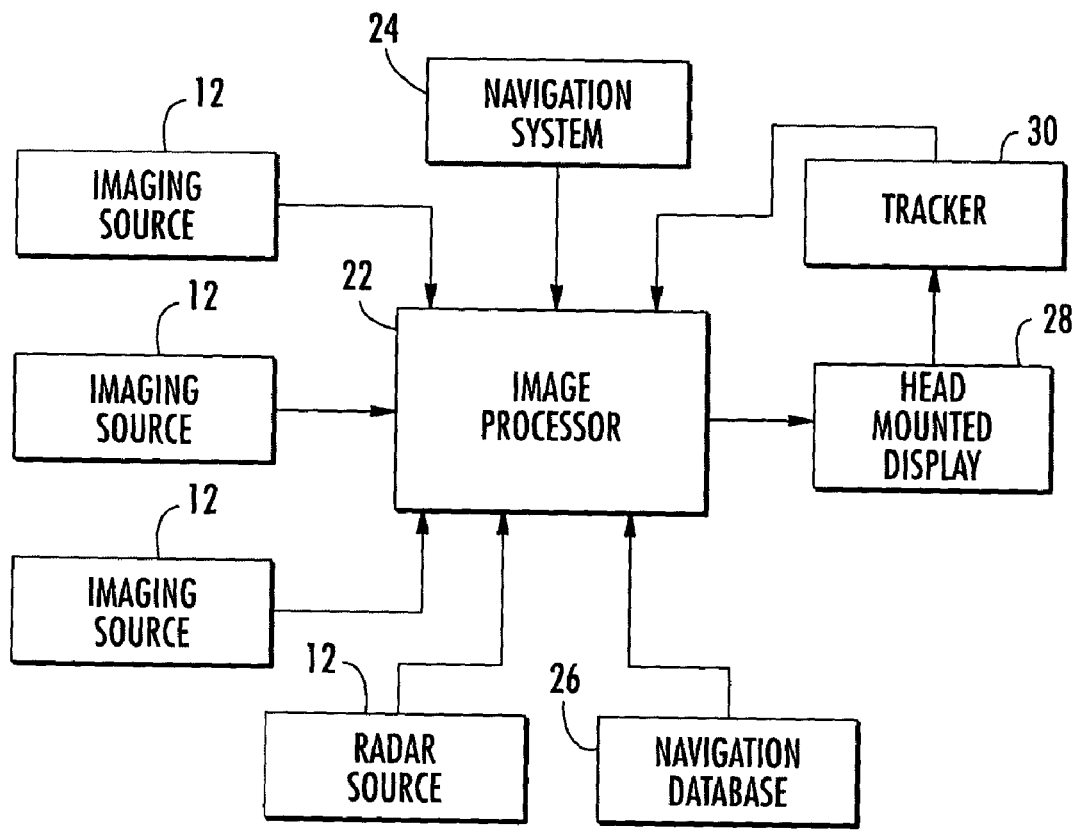

FIG. 2A is a block diagram of a system for providing an enhanced vision system according to one embodiment of the present invention.

Figure 2B:
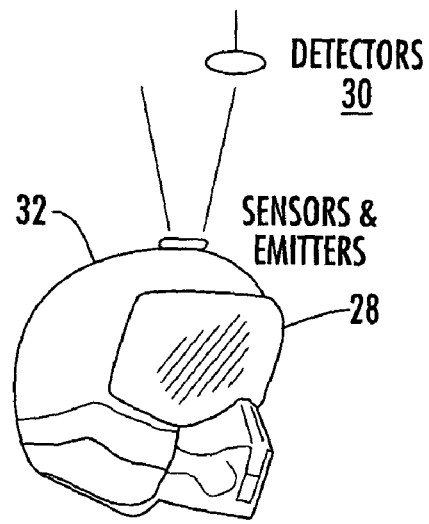

FIG. 2B is an illustration of a head mounted display with a helmet-tracking system for use with the present invention.

Figure 3:
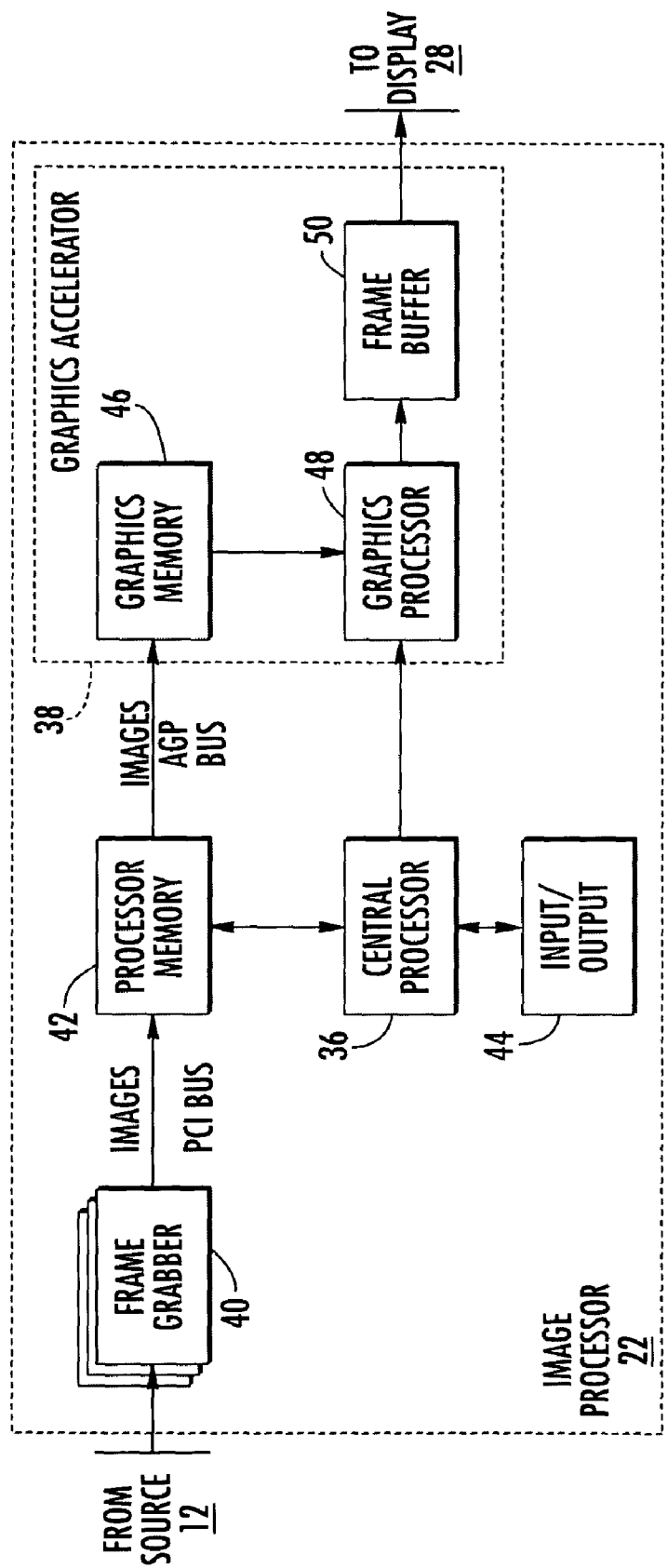

FIG. 3 is a block diagram of the image processor used for providing an enhanced vision system according to one embodiment of the present invention.

Figure 4:
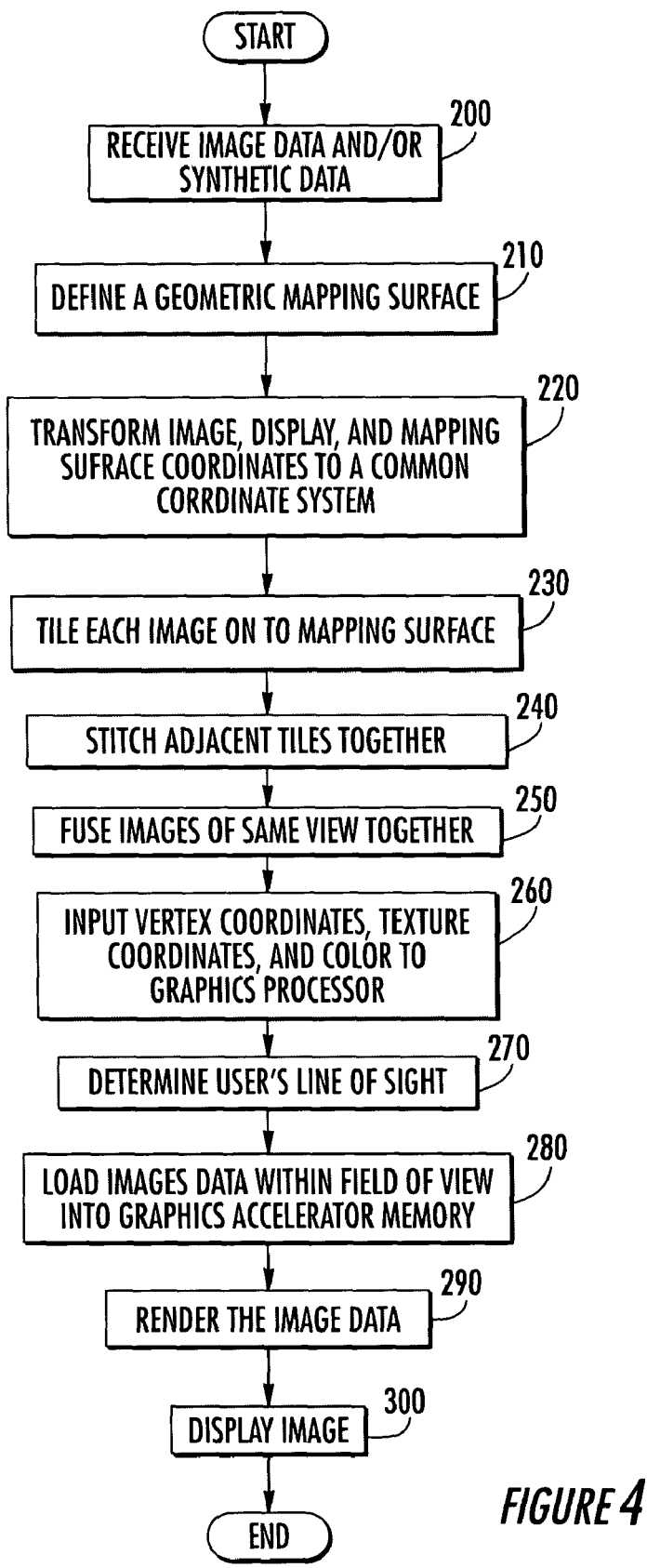

FIG. 4 is a block diagram of the operations performed to provide an enhanced vision system according to one embodiment of the present invention.

Figure 5:
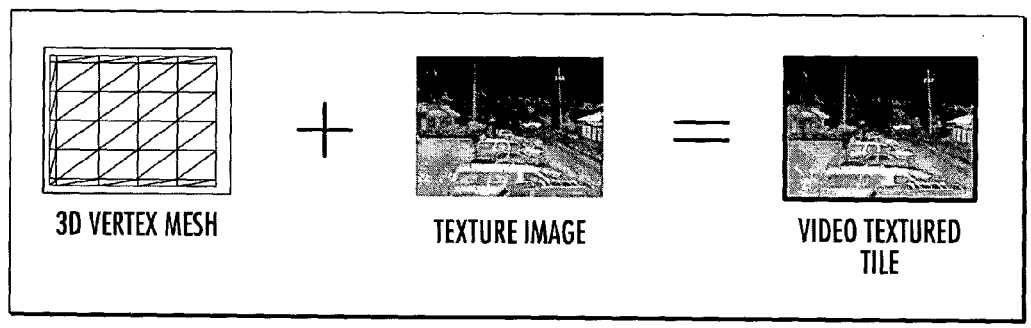

FIG. 5 is an illustration of the mapping of the texture image onto a vertex mesh.

FIGS. 6A-6D are diagrams illustrating different placement of the mapping surface and associated problems therewith.

Figure 7:
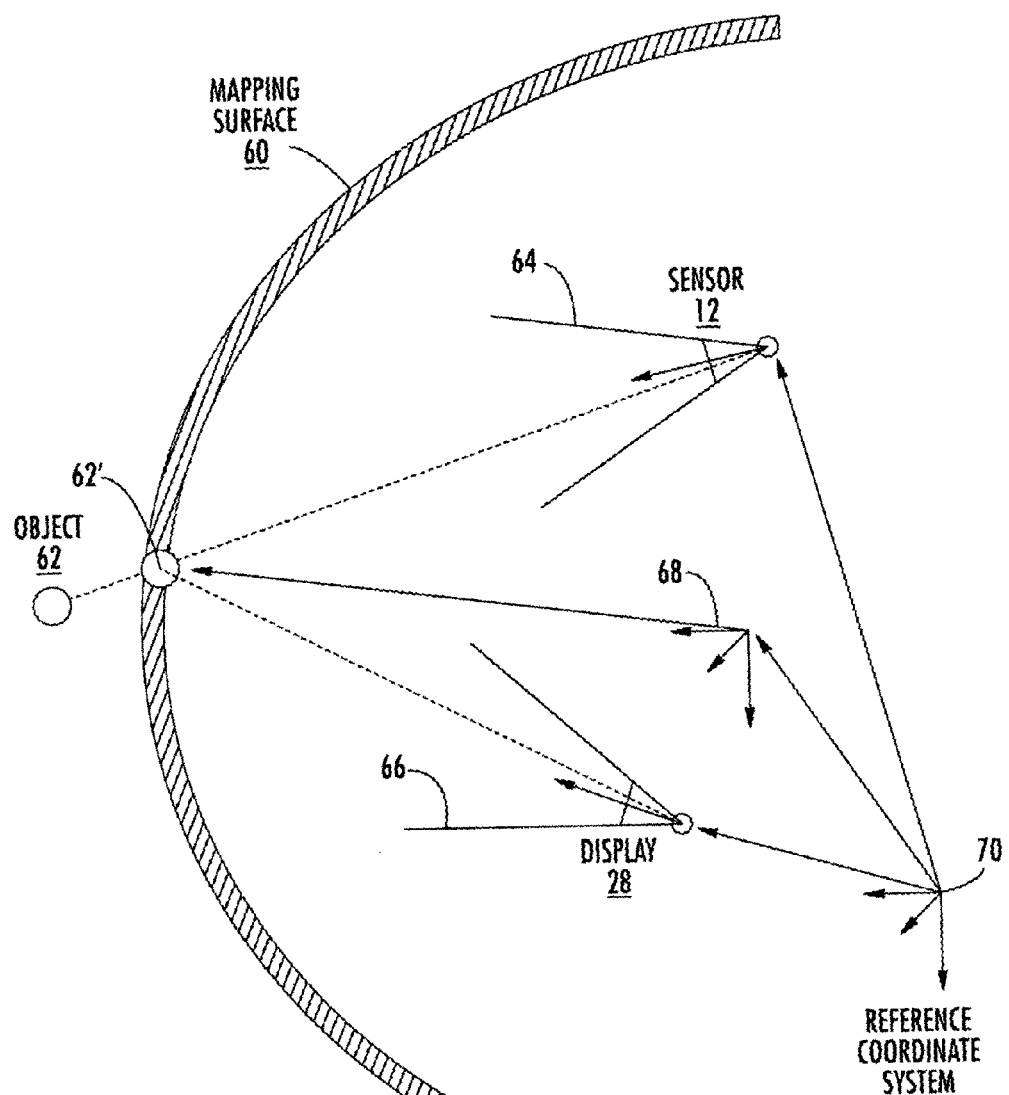

FIG. 7 is a diagram illustrating the different coordinate systems for the sources, display, and mapping surface.

Figure 8:
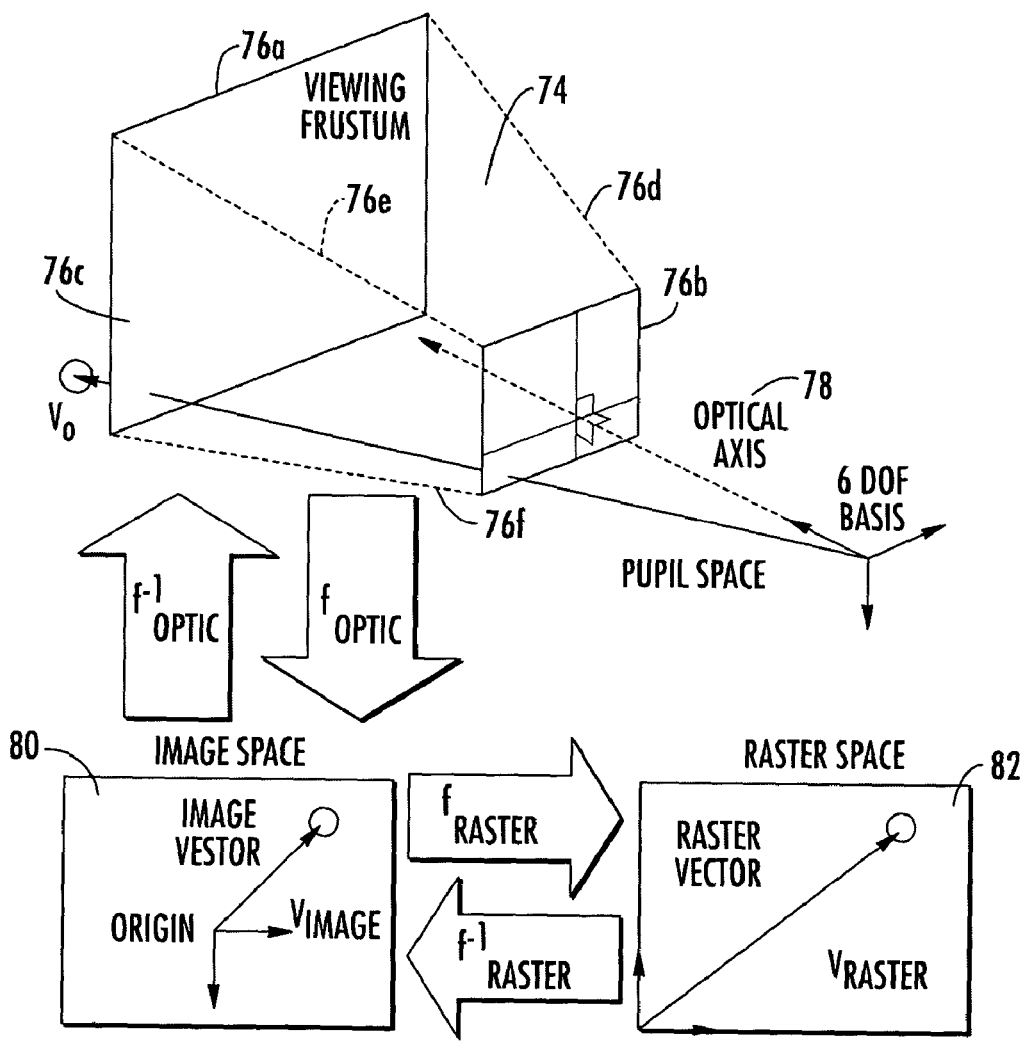

FIG. 8 is a diagram illustrating transformation of the sources and the display between different coordinate systems.

Figure 9:
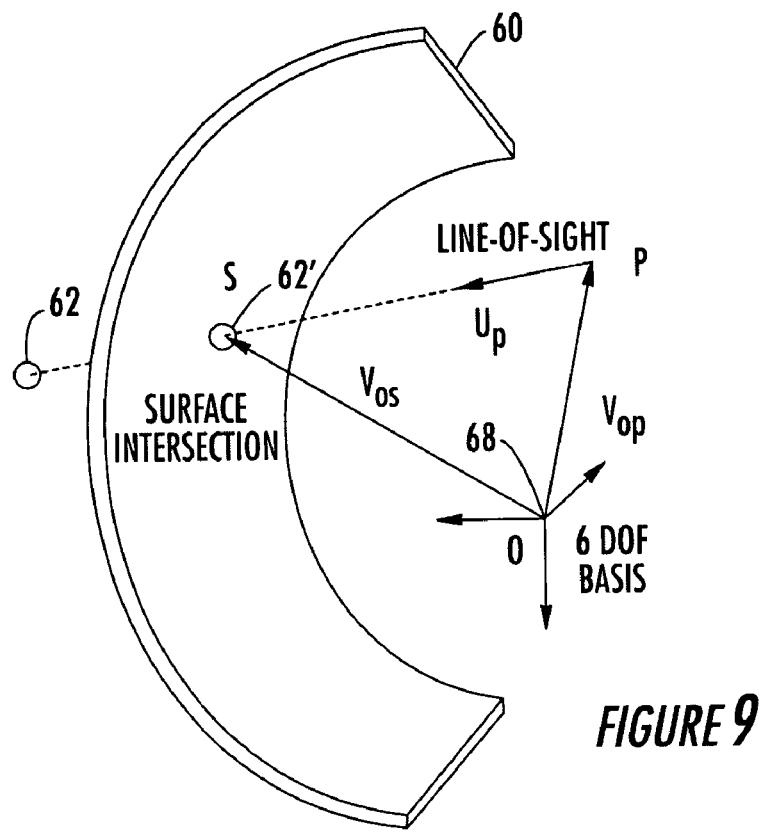

FIG. 9 is a diagram illustrating transformation of the mapping surface between different coordinate systems.

Figure 10:
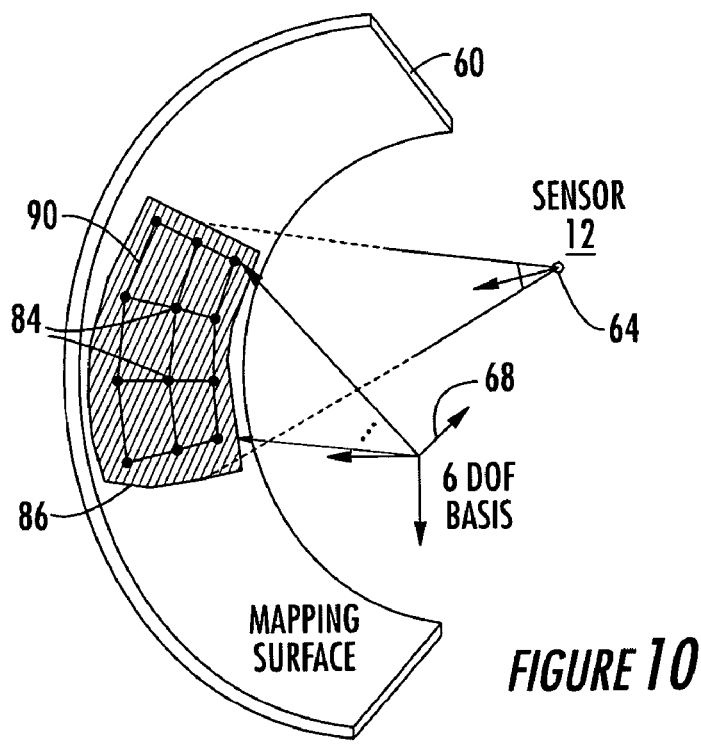

FIG. 10 is a diagram illustrating tiling of images onto the mapping surface.

Figure 11:
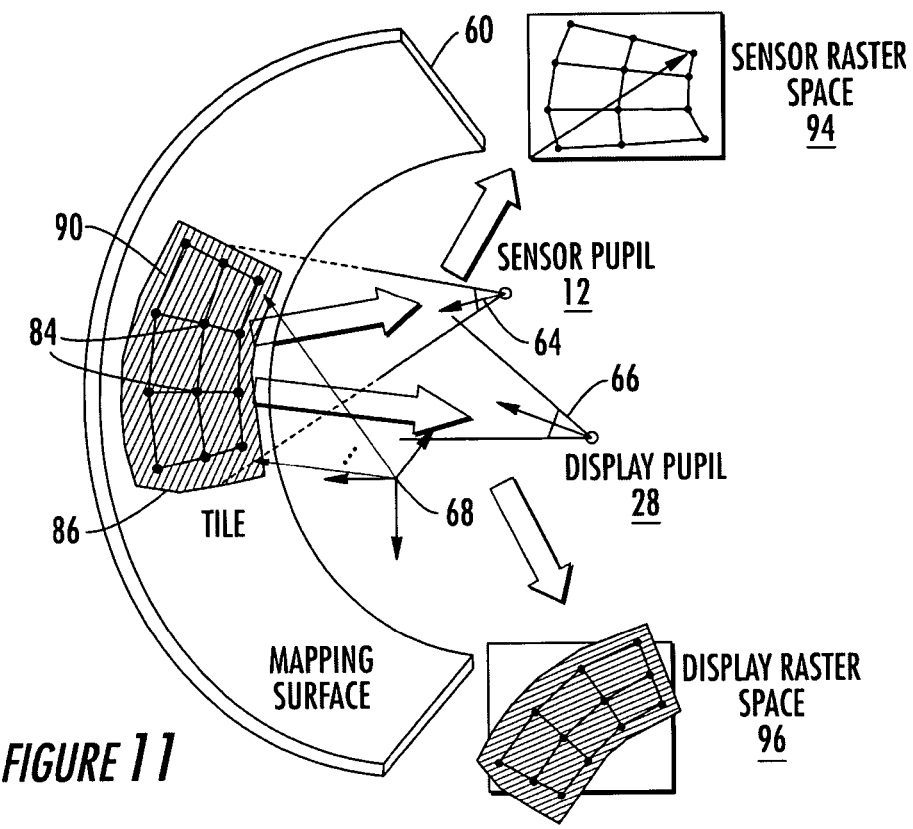

FIG. 11 is a diagram illustrating transforming and rendering of an image from a mapping surface to a display.

Figure 12:
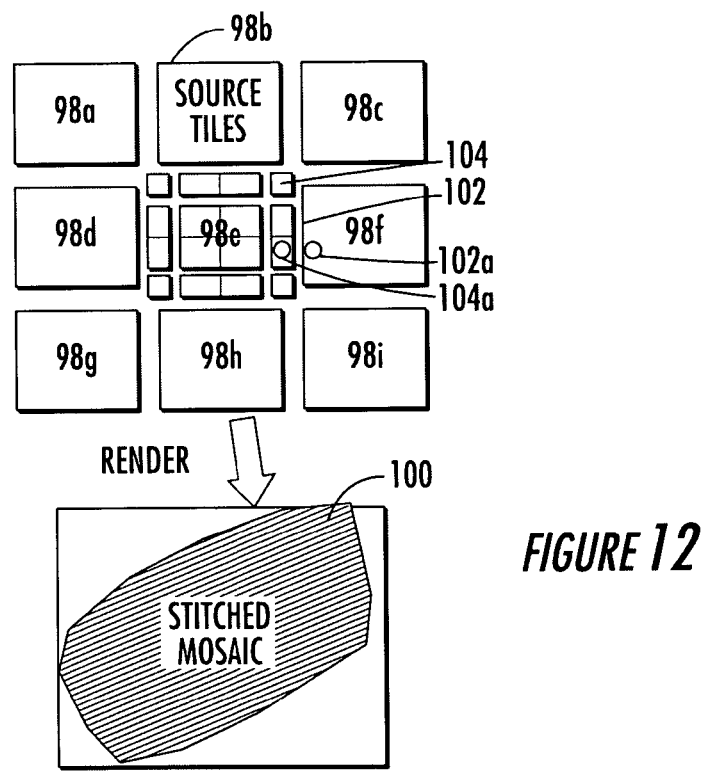

FIG. 12 is a diagram illustrating stitching of adjacent tiles to form a composite image.

Figure 13:
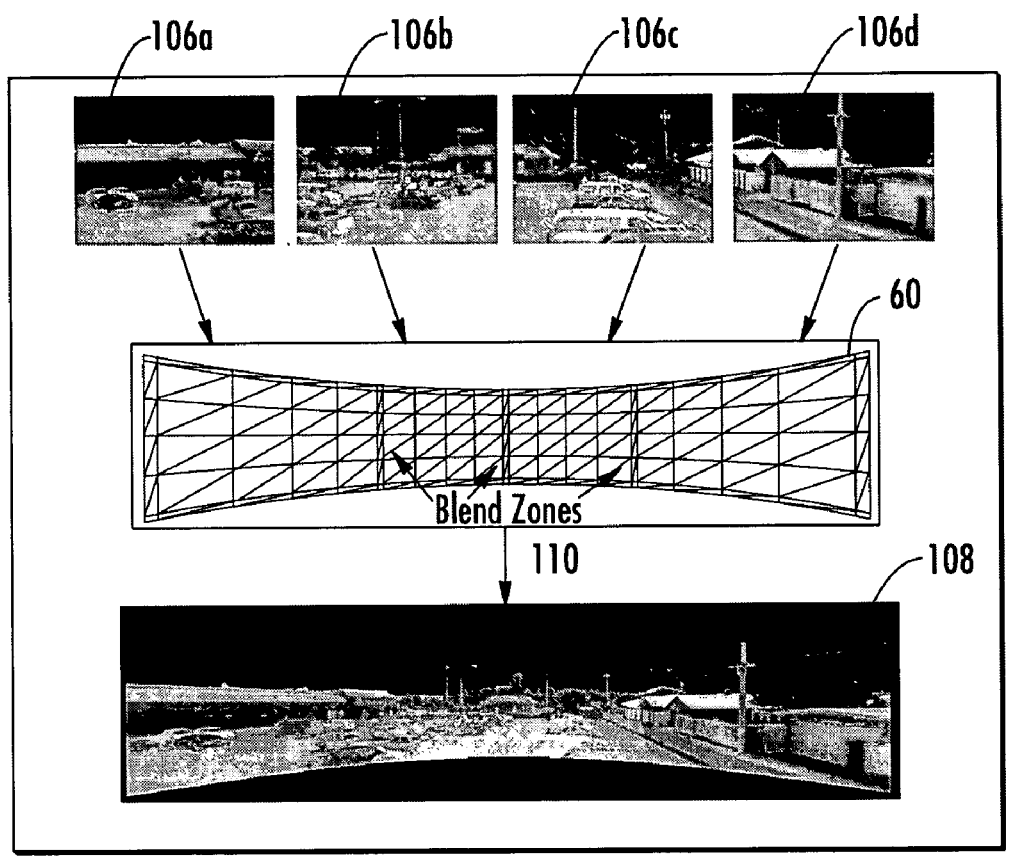

FIG. 13 is a diagram illustrating stitching of adjacent tiles to form a composite image and further illustrating the use of blending zones.

Figure 14:
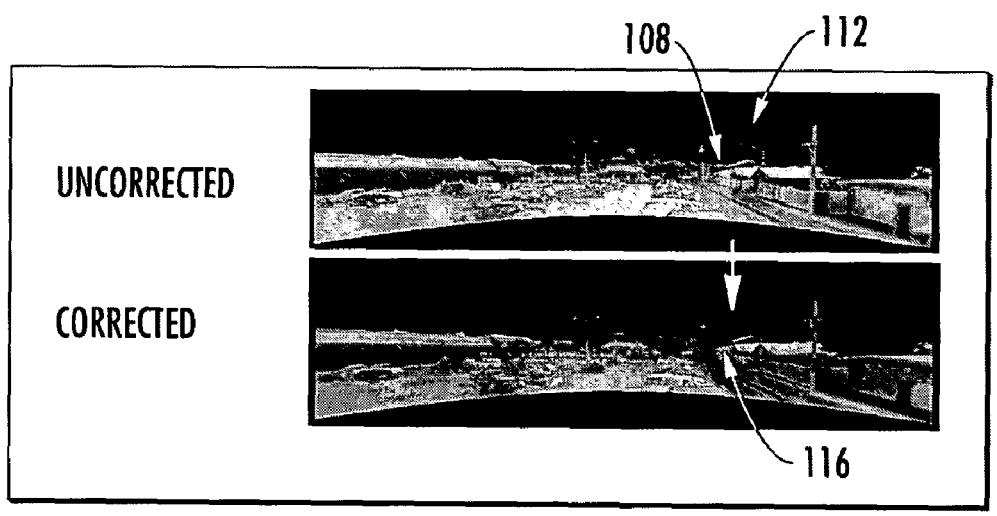

FIG. 14 is a diagram illustrating correction of anomalies at the junction between adjacent images.

Figure 15:
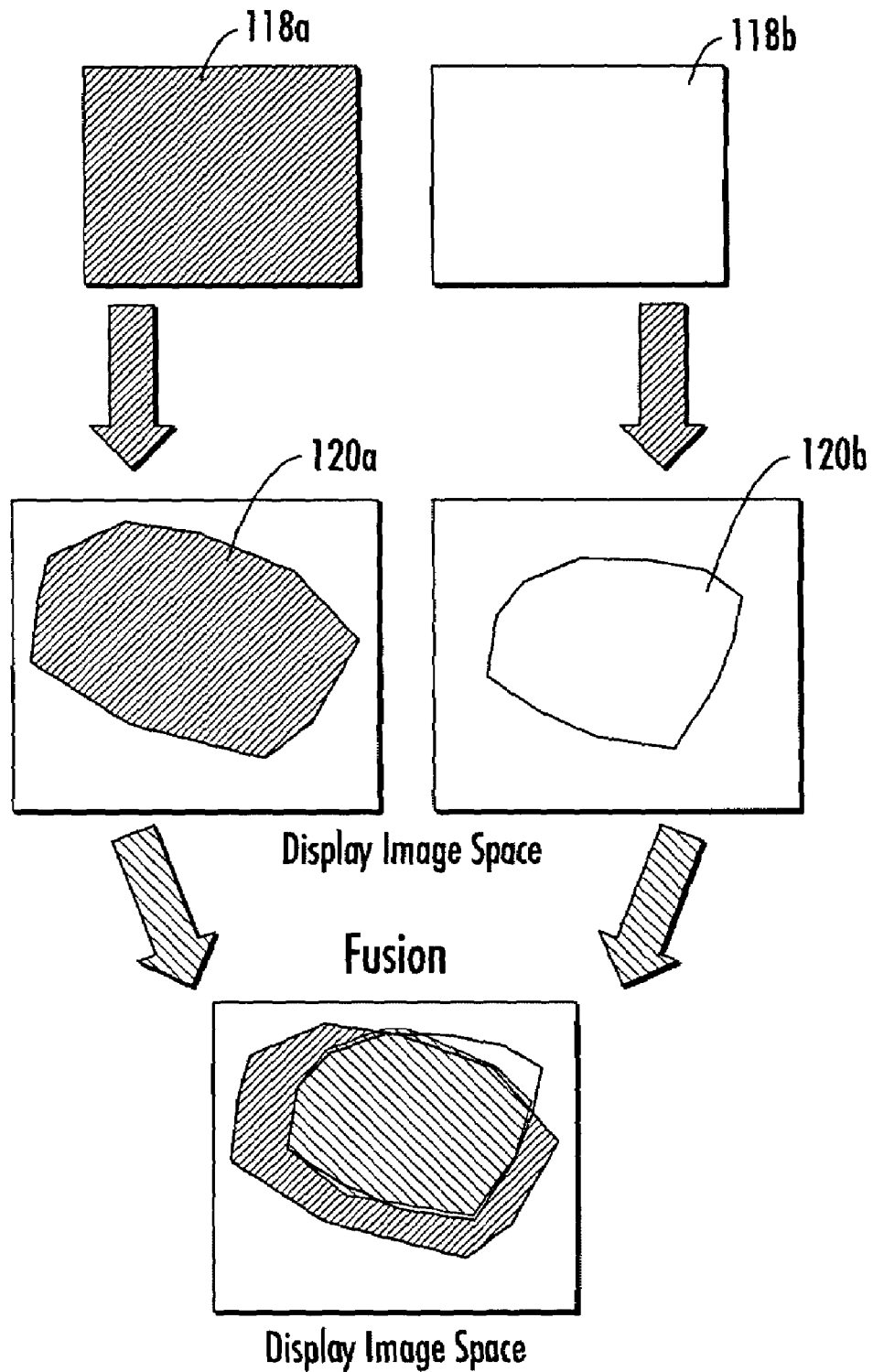

FIG. 15 is a diagram illustrating fusing two images together to form a composite image.

Figure 16:
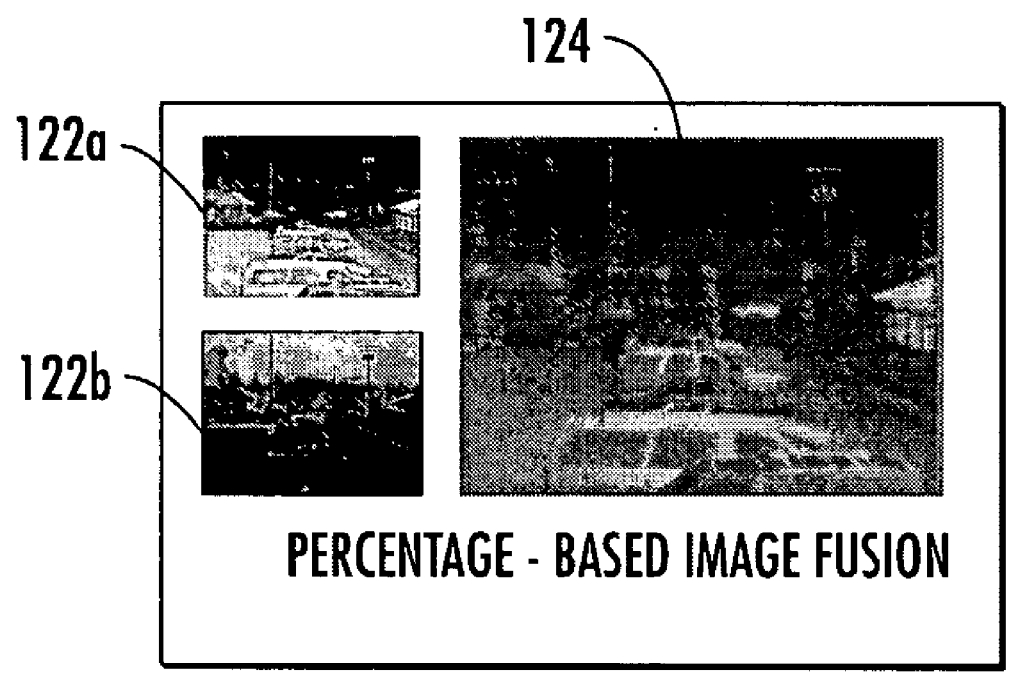

FIG. 16 is a diagram illustrating the results of percentage-based fusing of two images to form a composite image.

Figure 17:
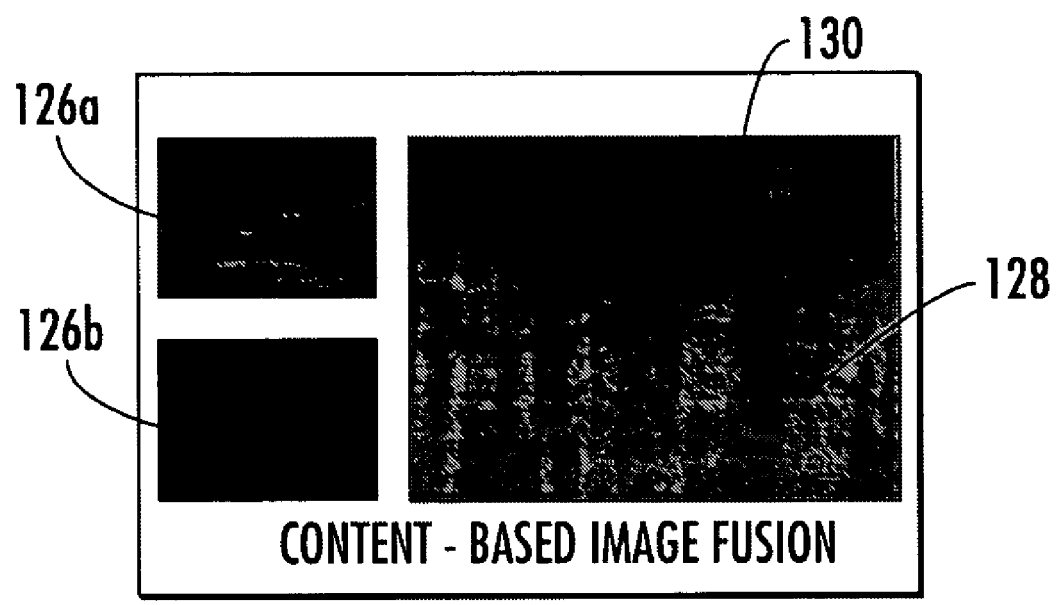

FIG. 17 is a diagram illustrating the results of content-based fusing of two images to form a composite image.

Figure 18:
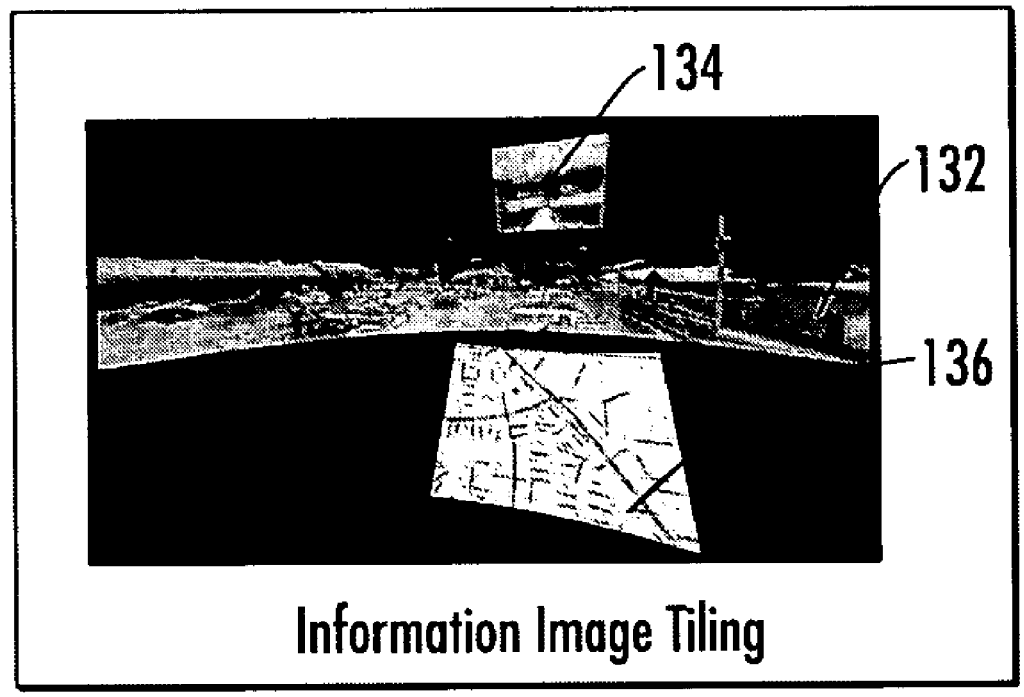

FIG. 18 is a diagram illustrating tiling of different images within the display.

Figure 19:

FIG. 19 is a diagram illustrating fusion of an infrared image with a synthetic database image.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides systems and methods for use in enhanced vision displays. The systems and methods of the present invention receive image data from a plurality of sources located at different positions on a vehicle or in an area of interest. The systems and methods assimilate the images from each source into a composite image. The system may also be provided with synthetic data from a data source. Both sensors and synthetic data sources are referred to herein as a source. The systems and methods of the present invention detect the current line of sight of the user of the system. Based on this line of sight (LOS), the systems and methods display and image to the user representing the user's current field of view (FOV).

The systems and methods of the present invention reduce issues with regard to parallax in the displayed images. Specifically, the systems and methods of the present invention create one or more artificial mapping surfaces at a selected distance in front of the vehicle or point of interest. This artificial mapping surface allows the various images from the different sources to be correlated by a common frame of reference, with all of the images from each source being projected onto the mapping surface. The mapping surface creates a frame of reference for correlating the difference in line of sight to an object of interest between the observer and the sources due to the distance separation between the observer and the sources and the distance between the sources themselves.

Further, the sources, display, and mapping surface all have different coordinate systems. The systems and methods of the present invention create a common coordinate system and transform the images from each of these components to the common coordinate system. This, in turn, allows the systems and methods of the present invention to correlate the images from the various sources and provide them to the user in the viewer's frame of reference to thereby reduce and possibly eliminate parallax.

In addition to correcting for parallax, the systems and methods of the present invention also provide improved methods for stitching various tile images together into a composite or mosaic image. The systems and methods of the present invention overlap the edges of tile images received the same type of sources that are taken of adjacent or overlapping fields of view. In the overlapped region between the two tile images, the systems and methods of the present invention define blend zones that have two vertical edges. In the blend zones, the systems and methods of the present invention alter the intensity of individual pixels of each tile image so as to blend the two tile images together. The pixels of the left image in the blend zone are tapered from an intensity value of one (1) for the pixels adjacent to the left edge of the blend zone to an intensity value of zero (0) for the pixels adjacent to the right edge of the blend zone. In an opposite manner, the pixels of the right image in the blend zone are tapered from an intensity value of zero (0) for the pixels adjacent to the left edge of the blend zone to an intensity value of one (1) for the pixels adjacent to the right edge of the blend zone. This alteration of pixel intensity values in the blend zone provides an enhanced stitch between the two images. Top and bottom stitching is performed in the same manner.

The systems and methods of the present invention also provide a method for overlaying or fusing images from different types of sources. Specifically, the system of the present invention may include two different types of sources having either the same or overlapped fields of view. The sources provide different images of the same field of view; each source having associated advantages and disadvantages. For example, one source could be a video camera that provides images that may be affected by the amount of light or visibility and the other source may be an infrared source that provides images based on heat sensing. The systems and methods of the present invention provide a method for overlaying or fusing the images from these sources together to provide an enhanced image.

The systems and methods include two alternate methods for fusing the images. In the first alternative, the systems and methods of the present invention assign a percentage value to each tile image with regard to intensity. For example, one tile image may be defined with a 30% intensity and the other a 70% intensity. The images are then summed together in this intensity percentage ratio, thereby providing the user with the benefit of both images. In the second alterative, each tile image is displayed based on its content. For example, given a visible and an infrared image covering similar fields of view, the images can be combined at pixel level, where priority can be given to the infrared image based upon its pixel intensity. In this case, if the infrared pixel is at 75% of maximum, then the resulting pixel would be composed from 75% of the IR pixel intensity and 25% visible pixel intensity.

The systems and methods of the present invention further include methods for minimizing anomalies in a given displayed image. The systems and methods of the present invention evaluate the intensity values associated with local areas in adjacent images. The systems and methods of the present invention provide the means for local brightness discontinuity correction for adjacent as well as similar field of view images.

As summarized above, the systems and methods of the present invention provide an enhanced vision system. The various aspects of the present invention are provided in greater detail below.

It is first important to note, that the systems and methods of the present invention can be used in any environment where visual situational awareness is a concern, be it in an aircraft, automobile, or other type of vehicle or in a specified location or environment, such as a secured or surveillance area. In the below embodiments, the systems and methods are disclosed with regard to an aircraft. The aviation environment is a dynamic environment and aids in illustrating the robustness of the system. It is understood, however, that this is only one example of the use of the system and methods and that a wide variety of other applications are envisioned for use of the invention.

FIGS. 1A and 1B illustrate an aircraft 10 in which the systems and methods of the present invention may be incorporated. In this embodiment, the system of the present invention may include a plurality of sensors 12 located at various positions on the aircraft. Sensors are located at the front of the aircraft in different orientations to provide various forward 14, side 16, upward 18, and downward views 20. Further, in some embodiments, sensors may be located in the rear of the aircraft for rear views 21. While not illustrated, various sensors may also be located on the wings, top, and bottom sides of the aircraft. Typical sensors used with the system are low-light level video cameras, long-wave infrared sensors, and millimeter wave radar, to name a few.

As illustrated in FIG. 2A, the various sensors 12, (such as various image sources and radar sources as depicted in F*igure* 2A), are electrically connected to an image processor 22 located on the aircraft. The image processor of the present invention is responsible for assimilating the various images from the sensors for display. Also connected to the image processor is a navigation system 24 for providing positional information, (i.e., longitude, latitude, pitch, roll, yaw, etc.), related to the aircraft. A navigational database 26 may also be available for providing synthetic navigational data to the system. Synthetic navigational data is typically 3D graphic data that simulates the terrain of other points of interest in a geographic location.

Importantly, also connected to the image processor is a display 28. In this particular embodiment, the display is a helmet-mounted display located in the helmet of the pilot or other viewer. Associated with the helmet is a helmet-tracking device 30. The helmet-tracking device provides information to the image processor concerning the present line of sight of the user. As illustrated in FIG. 2B, a series of sensors or reflectors are located at various positions on the helmet 32 worn by the user. The tracking device 30 is located at a position relative to the helmet and tracks the movement an orientation of the sensor to determine the line of sight of the user relative to the vehicle. Such tracking devices are available from military suppliers such as BAE Systems in Santa Monica, Cal., or commercial suppliers such as Ascension Technology Corporation located in Milton, Vt., as well as several other suppliers not mentioned here. It is understood here that a helmet-tracking device is not required for the invention. Instead of use such a device, the orientation of the vehicle itself or a joystick control, etc. could be used to determine the user's line of sight. Similarly, in a security or surveillance location environment, the line of sight could be a fixed value trained on the view of interest.

FIG. 3 provides a detailed operational diagram of the image processor 22. The image processor includes a central processor 36 and a graphics accelerator 38. Connected to the various sensors 12, (not shown), is either one or a series of frame grabbers 40. The frame grabbers capture image data from the sensors and store these images via a PCI bus in a processor memory 42. Associated with the central processor is an input/output interface 44 for receiving inputs from the helmet-tracking device 30, navigation system 24, navigation database 26, as well as various pilot input commands. The graphics accelerator 38 includes a separate memory device 46, a graphics processor 48, and a frame buffer 50 connected to the display in the helmet, not shown.

FIG. 4 illustrates the operation of the image processor. It is understood that not all operations illustrated in FIG. 4 happen sequentially, but instead, the central processor and graphics processor perform some of the steps concurrently. As a general overview, in operation, the frame grabber(s) 40 receives image data from the various sensors 12 and stores this data in the processor memory 42. (See step 200). The central processor 36, as an initial step creates a geometric mapping surface located at a selected distance from the aircraft. (See step 210). The geometric surface is used to tile the various images from each sensor onto a common reference frame. The geometric surface is used to define vertex meshes that describe image tiles in 3D space.

The central processor establishes a raytracing model involving vector transformations between the various image source, mapping surface, and display spaces (see step 220). Each image tile vertex is mapped into its associated source image, defining a texture coordinate. These vertex and texture coordinates, along with other components yet to be explained, are sent to the graphics processor (step 260) which renders these descriptions as 3D video-textured triangles.

In particular, the central processor of one embodiment of the present invention communicates with the graphics accelerator using an OpenGL Application Programming Interface. For each vertex of the mapping surface, the central processor provides three vector-valued data sets to the graphics processor 38 using the OpenGL command structure. The central processor provides: 1) a vertex vector representing a 3D coordinate point on the geometric mapping space, 2) the texture coordinate vector representing the associated texture image location corresponding to the vertex, and 3) a color vector that indicates a particular color (red, green, and blue) and an alpha-blending value, all used to determine how the associated pixels are to be displayed.

This vertex, texture, and color information is sent to the graphics processor as collections describing triangle meshes. The graphics processor uses these constructs to render the triangle meshes, stitching individual tiled images together at their respective edges to form a composite image. (See step 240). Specifically, edges of each image are overlapped with adjacent tiles. The vertex associated with texture coordinates in these overlapped regions is manipulated to ensure coherent blending of adjacent images. To accomplish this procedure, the central processor alters the intensity a value associated with the color for the vertex when the vertex information is provided to the graphics processor. The procedures for stitching images together are discussed more fully below.

Although the systems and methods of the disclosed embodiment use an OPEN GL command structure to communication with the graphics processor, it must be understood other command structures could be used and are contemplated herein.

The systems and methods of the present invention also provide the ability to fuse images of similar fields of view together. (See step 250). Specifically, the system may include one of more different types of sources with overlapping field of views. These sources create different images of the same view based on the characteristic of the sources. The graphics processor blends these images together such that the benefits of both images are incorporated into the displayed image. The procedures for fusing images together are discussed more fully below.

In addition to correlating the texture coordinates of each image to the vertices of the geometric mapping surface, the central processor also determines from the head-tracking device 30 the line of sight of the user. (See step 270). The central processor loads those tile images stored in the processor memory 42 that are within the field of view for the current line of sight into the memory 46 of the graphics accelerator 38. (See step 280). As each collection of vertex values is received from the central processor, the graphics processor associates the data from the texture images stored in memory 46 with each vertex of the geometric space that is in the field of view of the user and renders the image data into the display space. (See step 290). The rendered data is then provided to the display via the graphics processor video output electronics. (See step 300). This process is continually looped at the display video vertical frame rate using the freshest input imagery that is available.

As mentioned, a major issue with vision systems is the phenomenon of parallax, which is caused by the physical separation of the sources from the viewer, as well as the separation between the sources themselves. This separation causes the sources to have a different perspective relative to an object from that of the position of the user. To remedy these issues, the systems and methods of the present invention provide two procedures that reduce, if not eliminate issues with parallax. Specifically, the systems and methods of the present invention first define geometric mapping space that allows the images from the various sources to be mapped to a common space. Secondly, the systems and methods of the present invention create a common reference coordinate system and transform the sources, mapping surface, and display to the common or primary coordinate system.

With regard to the geometric mapping surface, the systems and methods of the present invention approximate the geometry of the real-world environment being imaged by the sources with a continuous mapping surface. The images from the sources are mapped to the mapping surface and are then mapped to the display. In this manner, all of the images of the system are correlated to a common or primary coordinate system for viewing.

With reference to FIG. 5, the geometric mapping surface is defined as a series of mesh triangles in the 3D space. Each triangle is defined by three (3) vertices. As illustrated in FIG. 5, for each vertex in the geometric space, the central processor provides texture coordinates that relate the vertex to the coordinates to a location within the associated input image. (See step 230 of FIG. 4). In this way, the vertices are raytraced from the mapping surface into the source image to determine the associated texture coordinates for rendering. (See step 290). The image is then rendered and displayed.

Figure 6A:
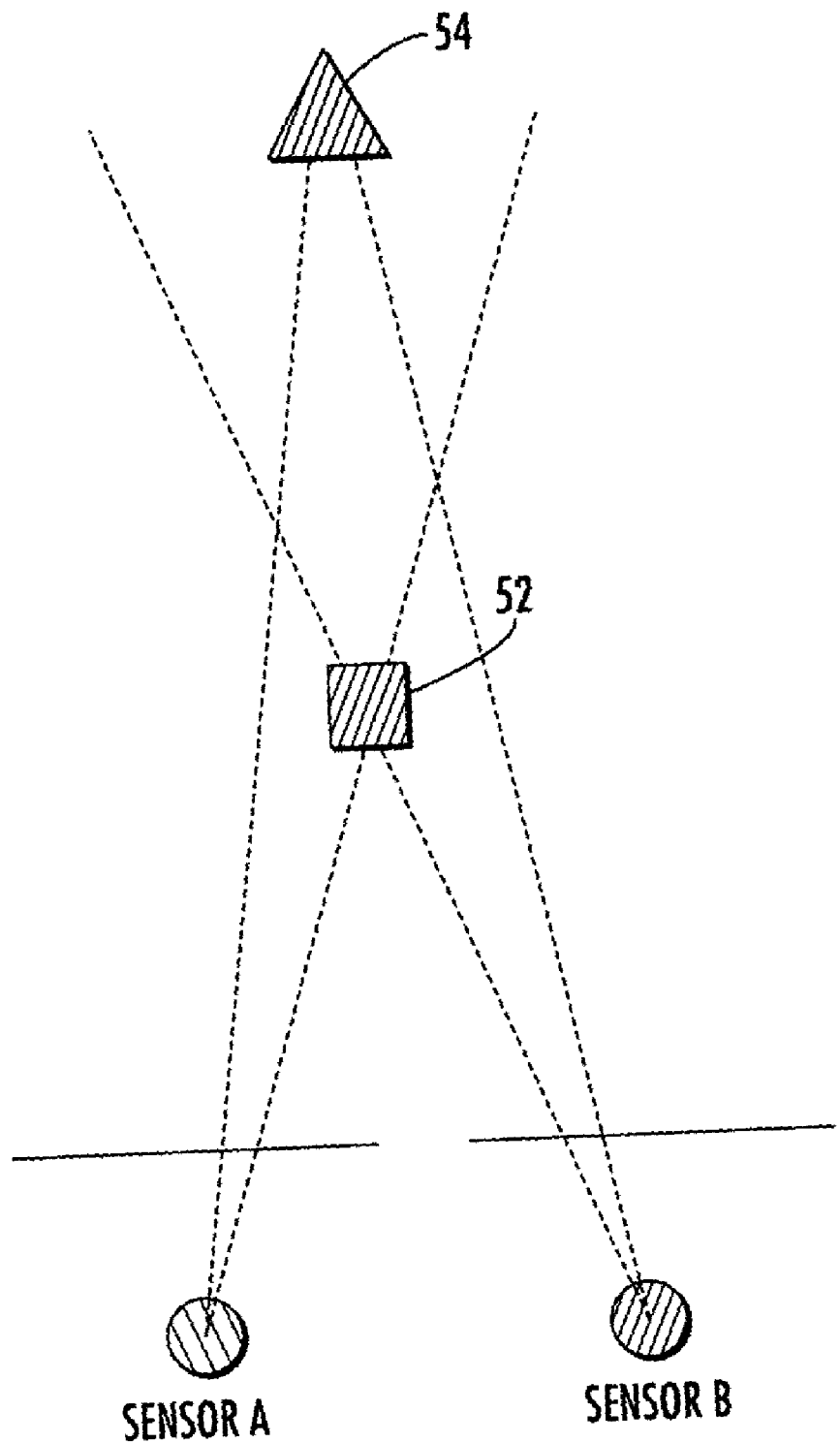
Figure 6B:
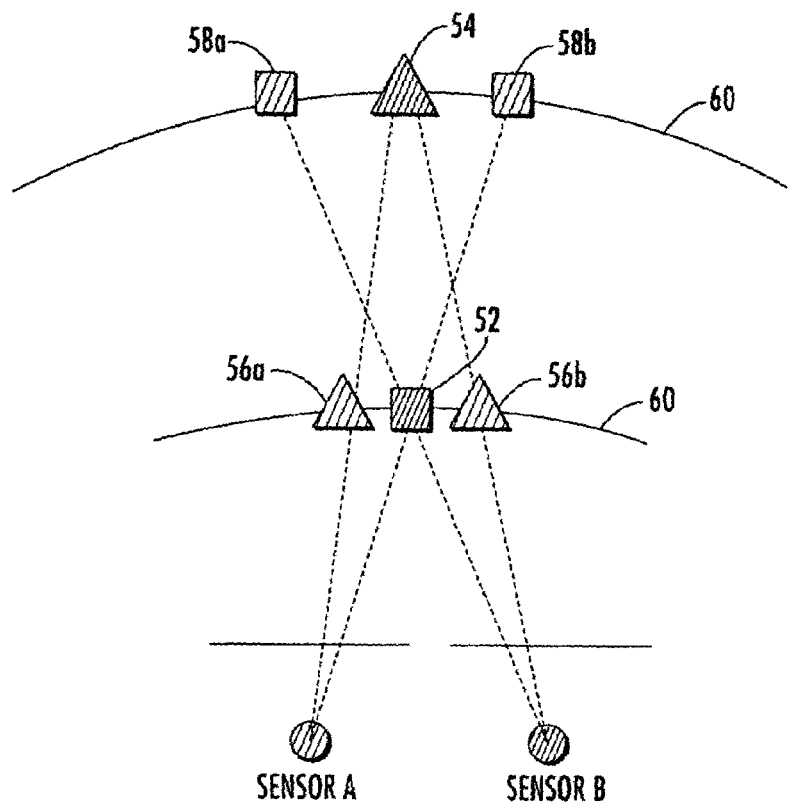
Figure 6C:
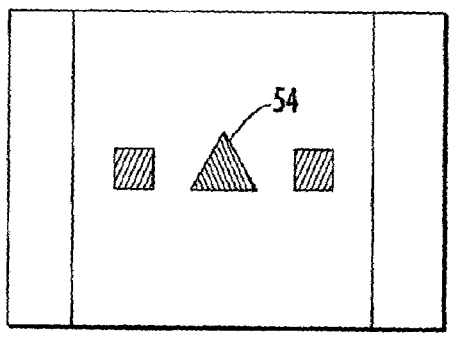
Figure 6D:
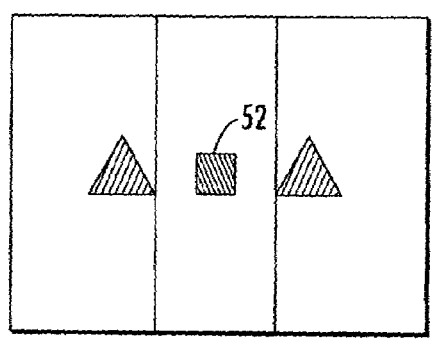

With reference to FIGS. 6A-6D, a geometric mapping surface is selected in order to determine a vector field for each source. In other words, a common outer boundary is chosen for all sources. The images from each source are then mapped to the geometric surface and then to the display for a coherent image of the area surrounding the aircraft. The selection of the position of the geometric surface relative to the position of the sources is critical to reducing the issues with parallax. FIG. 6A illustrates two objects, (square object 52 and triangle object 54), in space at different distances from the two sensors, Sensor A and Sensor B. The sensors are slightly "towed in" relative to each other in order to create an increased overlap of the sensors' fields of view. (This is typically done with the sensors 12 of the system for this reason.) For accurate mapping of the two objects, a mapping surface 60 should be chosen so that the two objects will appear appropriately to the observer. FIGS. 6B-6D illustrate the issues involved with choosing the location of the mapping surface.

Specifically, FIGS. 6B and 6D illustrate the problems associated with locating the surface 60 at the location of the square object 52. In this instance, after the surface is chosen, the square object 52 is projected onto the same location of the surface 60 for each sensor. For Sensor A, the triangle object maps to position 56a, while for Sensor B, the triangle object maps to surface at position 56b. As illustrated in FIG. 6D, when the images from the two sensors are combined, it will appear to the observer that there are two triangles in the field of view.

With reference to FIGS. 6B and 6C, in a similar manner, if the surface 60 is selected at the position of the triangle object 54, the triangle object 54 will be mapped to the same location of the surface 60. For Sensor A, the square object maps to position 58a, while for the Sensor B, the square object maps to surface at position 58b. As illustrated in FIG. 6C, in this instance, when the tile images from the two views are combined, it will appear as though there are two squares in the field of view.

As illustrated in FIGS. 6A-6D, the selection of the position of geometric mapping surface is a critical issue in reducing parallax anomalies. For example, in the case illustrated in FIGS. 6A-6D, the appropriate mapping surface location is theoretically indeterminate for objects at different ranges along the same ray. In other words, the location of a mapping surface is a function of the relative 3D geometry expressed from the viewpoint perspective, which is discontinuous at best, and indeterminate at worst. This is why the surface is chosen to approximate the geometry being imaged in order to obtain a solution that minimizes the parallax anomalies.

In the case of an aircraft a sphere may be used as the geometric mapping surface. At a significant altitude, parallax anomalies tend toward zero, allowing the geometric mapping surface to be chosen at some theoretical maximum distance. However, as the aircraft descends and approaches the ground, the distance between the aircraft location and the geometric mapping surface must be decreased to more closely approximate the distance between the aircraft and surrounding objects, such as the terrain. Thus, for low altitude flight, landing, and taxiing or in the case of ground vehicles or ground applications, a flat geometric surface may be used either with or as opposed to a sphere to approximate the surface of the ground. The approximation can also be further specified based upon apriori knowledge of the geometry being imaged, at the cost of computation complexity.

For example, some synthetic navigation data include terrain data that is represented in 3D by using polygons to represent various terrain features. The polygons could be used for mapping surfaces. In this instance, the system would include various geometric surfaces, and the surface that is closest to a display would be used as the mapping surface. As the aircraft moves, the geometric mapping surface would change to the then closest geometric surface from the synthetic data.

In another example, the system could receive data from a ranging device that indicates a range to terrain and other features. This range data can be used to construct the geometric mapping surface.

Once the geometric mapping surface is selected, it is then important to create a common or primary coordinate system for transforming between the coordinates systems of the sources, mapping surface, and display. FIG. 7 illustrates a spherical geometric mapping surface 60 that has been selected relative to a source (sensor 12) and an object 62, with the object projected onto the surface at 62'. As can be seen in this figure, the source (sensor 12) has a coordinate system 64, the display has a coordinate system 66, and the mapping surface has a coordinate system 68 that are all different from each other. The objective is to create a reference coordinate system 70 that allows for mapping between the vector spaces of the source (sensor 12), the geometric mapping surface, and that of the display. This collection of surfaces, coordinate systems, and geometric mapping through vector spaces is referred to as the raytracing model.

The raytracing model uses a Cartesian reference space 70, typically tied to the coordinates of the vehicle. It is important to account for as many factors as possible to ensure an accurate transformation is performed. Specifically, each source and display is modeled as a full six-degree-of-freedom component to account for the x, y, and z position of the optical exit or entrance pupil, as well as pitch, roll, and yaw of the external optical axis. Further, the optics associated with each source also affects the perspective of the image received by the source, and there also may be distortions caused by the optics themselves, or by the pixel distribution (raster) of the source or display. In light of this, the transformations include modeling each source and display in the system as full six-degree-of-freedom component with non-linear transformations for optical and raster distortions.

This transformation process for sources and displays is more specifically illustrated FIG. 8. Specifically, the reference coordinates for each source or display is defined by a six-degrees-of-freedom 6DOF reference. Each component also has a viewing volume 74 in pupil space that is frustrum shaped. The frustum is defined by near and far planes, 76a and 76b, and left, right, top, and bottom sides, 76c-76f, that are half-angles from the line of sight 78 associated with the component. The line of sight is chosen along the x-axis of the coordinate reference of the component.

For sensor components, when an image is received by a sensor, the image passes through the optics of the sensor, which distorts the image 80. As such, the image is first transformed ($f_{optic}$) from the pupil space to the image space to account for these non-linear transformations due to the optics. Following this transformation, the image is then transformed ($f_{raster}$) to raster space, which establishes raster space origin and scaling for display on the raster 82. The transformations for a display are in the reverse order. Specifically, the raster space is first transformed to the image space ($f^{-1}_{raster}$), which, in turn, is transformed to the pupil space ($f^{-1}_{optic}$). These non-linear transformations can all be used in both the forward and inverse directions within the raytracing model.

The geometric mapping surface intersections can also transformed to the reference coordinate space 70 of FIG. 7. This is accomplished using a geometry-based transformation related to the specific geometric shape of the surface. Specifically, as illustrated in FIG. 9, from a given position P a line of sight $U_p$ is defined. A surface intersection S is defined where the line of sight intersects the mapping surface 60. The point is transformed to local Euclidean space and mapped to the surface $f_{surface}(U_p, V_{op})$. The surface intersection is then mapped from the surface $f^{-1}_{surface}(V_{os}, V_{op})$ and transformed to the reference coordinate system.

The above discussed transformations for the sources, mapping surface, and display are used to properly correlate the images captured by each source, so that the images can be properly aligned and displayed.

As mentioned, the central processor of the present invention associates each image from each source with the mapping surface. This procedure is referred to as tiling. For each image, an area or tile is defined on the mapping surface, typically by constant azimuth and constant elevation boundaries. Tiling not only allows for aesthetic shaping of the image boundaries, but also allows for accurate stitching and fusion blend coefficient definitions for each vertex of the mapping surface that is constantly rendered by the graphics processor.

FIG. 10 illustrates this tiling procedure. As discussed, the mapping surface 60 is defined as a collection of vertices 84. The central processor associates these vertices with the texture coordinates for a particular image. Specifically, the image 86 from a source 12 is effectively projected onto the mapping surface 60. The vertices are positioned relative to the mapping surface coordinate system 68. The vertices define a tile 90 that is a subset of the area covered by the projected image. It is this tile portion 90 that will then be rendered and displayed. By selecting a tile that is smaller than the size of the overall image, the fading or other degradations that are typically caused at the fringes of an image due to sensor optics or other distortions are eliminated from the tile image. The above process is performed for all images such that a series of tiles are created for use in displaying a composite image.

FIG. 11 illustrates the transformations used by the central processor to provide vertex and associated texture coordinates to the graphics processor to render and display images. FIG. 11 illustrates a source 12 having it own coordinate system 64 with an image 86 mapped to a mapping surface 60 having vertices 84 that correspond to the image. A display 28 having its associated coordinate system 66 is located in front of the mapping surface. Also illustrated is the raster space 94 of the source 12 and the raster space 96 of the display The tile vertices are mapped to the source raster space 94, which establishes 2D texture coordinates.

If the display 28 has linear display optics, the vertices 84 defining the tile are rendered as 3D textured polygons to thereby provide a perspective projection from the display pupil space to the display raster space 96. If the display has non-linear optics, the tile vertices are mapped to the display raster space to establish 2D vertex coordinates. The tile vertices are then rendered as 2D textured polygons. This is an orthographic projection from display image space to display raster space.

In addition to accurately mapping each image to a common mapping surface and providing transforms for relating the images, mapping surface, and display to a common coordinate system, the systems and method of the present invention also provide techniques for enhancing the images as displayed. As earlier stated, the systems and methods of the present invention provide methods for stitching adjacent image tiles together to form a composite image. (See step 240, FIG. 4). FIGS. 12 and 13 illustrate this stitching process.

In particular, FIG. 12 illustrates a series of image tiles 98a-98i that collectively define a horizontal mosaic image array 100. Each of these tiles was taken with sources that slightly overlap one another such that the adjacent edges of each tile contain identical imagery. For example, an edge portion 102 of tile 98f is a display of the same view as is displayed in edge portion 104 of the tile 98e. The same is true for all other adjacent portions of each tile. This applies to two dimensional mosaic arrays as well, where the top and bottom edges of vertically adjacent tiles are blended.

Given that the images are the same at the edge of each tile, the tiles are overlapped at their adjacent edges so that the common portions of the image are overlay each other. This relationship is established mathematically by the central processor. Specifically, the central processor, for each tile, defines the edge portions of each tile to have the same mapping surface vertices. For example, a pixel 102a in the edge portion 102 will have the same designated mapping surface vertices as a pixel 104a in the edge portion 104. More specifically, when the central processor sends information to the graphics processor for rendering the first tile 98e, it will send vertex, texture, and color information for the triangle strip representing the edge portion 104. When the central processor sends information for rendering the second tile 98f, it will send vertex, texture, and color information for the triangle strip representing the edge portion 102. Because the two pixels, 102a and 104a, for the different tiles are determined from independent but identical vertex strips, the graphics processor will render and display the two pixels at the same location on the display. This is done for each corresponding pixel in each adjacent tile where the images are the same so as to create an overlap between adjacent tiles. Note that this is done for all adjacent edges as is illustrated in FIG. 12. By overlapping the tiles 98a-98i, the composite mosaic image 100 can be displayed.

Although overlapping adjacent edges of tiles provides some level of stitching, merely overlapping alone does not provide a seamless image. For this reason, the systems and methods of the present invention further manipulate the images to create a hidden seam. With reference to FIG. 13, the systems and methods of the present invention leverage the texture modulation and pixel blending capabilities of OpenGL to hide the seams. Specifically, as shown in FIG. 13, a series of images 106a-106d are rendered on the mapping surface 60 to form the composite image 108. The systems and methods of the present invention define blending zones 110 on the mapping surface 60 at the location where the images overlap. Each blending zone defines a plurality of vertices on the mapping surface.

In order to blend the two images, the central processor of the present invention alters the intensity value of the vertex colors in the blend zone. Specifically, as stated previously, for each vertex, the central processor defines vertex coordinates, texture coordinates, and color. Associated with the color is an alpha blending value, which is used by the graphics processor to determine how the currently rendered pixel contributes to the contents of the frame buffer. In one embodiment of the present invention, the central processor defines vertex colors such that the texture modulation and blending capabilities of the graphics processor creates a tapering effect in the blend zones so as to blend the two tile images together. With texture modulation, the resultant pixel color begins as a solid color interpolated from the associated vertices, but is further modified by modulating this color with the associated texture image content. For example a triangle with all red vertices would normally be rendered as a solid red triangle, but when modulated by an associated monochrome texture image, the result is the appearance of a red triangular image. This modulation is performed independently for the red, green, and blue pixel values, thus a blue triangle with a green texture would result in a black pixel.

The blending functions involve weighted summation of the rendered pixel with the existing pixel in the frame buffer, performed independently for the red, green, and blue components. The first blending function ($f1_{blend}(\ )$) uses the interpolated vertex alpha value for the pixel to determine the weightings as Display=$f1_{blend}(\ )$=α*Image $A$+(1−α)*Image $B$.

The second blending function ($f2_{blend}(\ )$) uses the interpolated alpha only for the source pixel ImageA, and uses unity for the ImageB weighting, i.e.

Display=$f2_{blend}(\ )$=α*Image $A$+(1)*Image $B$.

When rendering the two triangle strips of a particular mosaic edge blend zone, the first strip is rendered using $f1_{blend}(\ )$, then the second strip is rendered using $f2_{blend}(\ )$. With some basic arithmetic, and assuming the frame buffer initially contains the pixel value Display0, the resulting pixel value can be shown to be Display2=α*Color$B$*Image$B$+α*Color$A$*Image$A$+(1−α)*Display0

Since the ColorA and ColorB are defined by the blend zone color taper as unity sum, Color$B$=1−Color$A$ Display2=α*(Image$B$−Color$A$*Image$B$+Color$A$*Image$A$)+(1−α)*Display0

Furthermore, assuming perfect image registration, or ImageB=ImageA, and the result is Display2=α*Image$B$+(1−α)*Display0

It can also be shown that the pixel value error due to misregistration can be expressed as DisplayError=α*Color$A$*(Image$A$−Image$B$)

This is true for every display pixel in the blend zone region since the triangle strips from each contributing source image is defined with identical vertex locations and unity-sum color gradients.

Although the blend zone definitions are designed to have unity sum, brightness mismatch between adjacent source images can still cause discontinuities in the composite image. This discontinuity is minimized by reducing the color magnitude of the inner blend zone vertices of the brighter image. The magnitude scale factor is calculated as the ratio of the relative brightness ratio of the adjacent images at the point in question. A simple local-area average is calculated at each blend zone texture coordinate for each source image. For example, as shown in FIG. 14, when two images are stitched together at a seam 112, a difference in brightness 114 between the images may occur. To remedy this, the intensity magnitudes for the brighter image may be scaled down by the relative intensity ratios, resulting in a more pleasing brightness match 116.

In addition to providing methods for blending of adjacent tile edges, the present invention also provides methods for fusing images from different types of sources. Image fusion allows the user to view a composite image that includes the unique advantages offered by each contributing source. An example is fusion of image from a video camera and an infrared source, where the fused image benefits from visual characteristics of the camera and heat visualization of the infrared source.

FIG. 15 is graphic illustration of fusion. As illustrated, the central processor 36 receives separate images, 118a and 118b, from two separate sources having the same or similar fields of view. In operation, the central processor defines the image meshes for each contributing image similar to the mosaic image tiles, however in this case, each contributing tile tends to overlap in large areas, rather than small blend zones. To accentuate one image or the other, the central processor uses the alpha blending color value of the tile vertices. For example, in a percentage-based method, the central processor assigns the same alpha value to every vertex in a particular mesh. By using the $f1_{blend}(\ )$ function, the mesh is rendered such that the source pixels are combined with the current display pixel values using the previously defined weighted sum Display1=$f1_{blend}(\ )$=α*Image$A$+(1−α)*Display0

As an alternative to percentage-based fusion, content-based fusion may be used. This method involves a similar percentage ratio blending, however, rather than using an alpha (α) value assigned to the tile vertices, the blending coefficient is determined from the source pixel intensity. This is referred to as a pixel driven alpha written in equation form as:

Display1=(Image $A/2^N$)*Image $A$+(1−Image $A/2^N$)*Display0

N=pixel bit depth

As an example, FIG. 17 illustrates an infrared image 126a and an CCD camera image 126b fused together, where the infrared tile vertices are assigned a red color value, and the CCD tile vertices are assigned a green color value. This emphasizes the spectral content of each source image by taking advantage of red-green opponent color contrast. For example, the glint on the car hood 128 comes from the visible image, and the power transformers on the telephone pole 130 are emphasized by the infrared image.

Other fusion techniques are contemplated for use with the present invention. These include, for example, arithmetic operations, frequency domain manipulation, and object identification and extraction.

In addition to the mosaic image stitching and image fusion, the image tiling capability also provides the ability to present picture-in-picture virtual displays distributed throughout the viewable space. For instance, it may be desirable to have a moving map presented in the lower display areas, similar to having a paper map in your lap. Another desire might be to have a rear-facing camera mapped to a tile in the upper display area, similar to a rear-view mirror. These concepts are depicted in FIG. 18, which shows a stitched horizontal infrared image array 132 in the forward view of the vehicle, a rear-view mirror tile 134 above, and a moving map tile 136 below. This imagery can be further augmented with a synthetic image source, such as a head-tracked 3D terrain rendering correlated with vehicle position.

In this instance, the central processor receives the output of a synthetic vision system that generates 3D terrain and graphics from a navigation database. The synthetic vision image is transformed to the mapping surface and rendered similar to the other source images, including the image fusion function. For example, FIG. 19 illustrates a synthetic image fused with the central area of the composite view of FIG. 18.

In addition to moving map data, other types of display data could also be displayed in a separate tile or fused with the images. For example, the aircrafts HSI and ADI displays, altimeters, airspeed, etc. could be displayed on the display as a tile or fused with an image to provide an integrated view allowing the pilot to view instrument readings while also viewing the environment surrounding the aircraft.

While not illustrated, the systems and methods also include the ability to provide picture-in-picture tiling, zooming, panning etc.

U.S. patent application Ser. No. 10/377,412, entitled: SYSTEMS AND METHODS FOR PROVIDING ENHANCED VISION IMAGING WITH DECREASED LATENCY, and filed concurrently herewith describes an image display system that uses a field programmable gate array or similar parallel processing device; the contents of which are incorporated herein by reference.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for providing images of an environment to a display, said system comprising:
   at least two image sources of different types including a first image source comprising a camera for capturing a visual image and a second image source selected from a group consisting of an infrared source, a radar source and a synthetic vision system, each image source having a field of view and providing an image of the environment; and
   a processor in communication with each image source and said display, wherein said processor:
   receives a selected distance;
   defines a mapping surface that is spherical in shape and has a radius equal to the selected distance, wherein the mapping surface approximates the environment within the field of view of said image sources, wherein the mapping surface comprises a plurality of vertex vectors each representing a three-dimensional coordinate of a mapping space;
   for a selected vertex of the mapping surface within the field of display of said image sources, determines a texture vector of the image provided by said image sources that corresponds to the selected vertex of the mapping surface, and provides a collection of vectors comprising the selected vertex of the mapping surface, the texture vector of the image, and a color vector;
   defines a model that relates a geometry of said image sources, a geometry of said display, and a geometry of the mapping surface to each other, wherein said image sources, display and mapping surface all have different coordinate systems, and wherein said processor is configured to define the model so as to provide for transforming said image sources, said display, and the mapping surface to a different coordinate system; and
   maps different types of images provided by said image sources to said display using the model,
   wherein said image sources including image source A have respective fields of view that overlap each other on the mapping space such that said image sources provide respective images having texture vectors that correspond to the selected vertex of the mapping space, wherein respective images provided by each of said image sources have a unique characteristic, wherein said processor, for each image source, provides the selected vertex of the mapping surface and the texture vector of the respective image source such that the respective images from said image sources overlap on said display, and wherein said processor combines the respective images into a resultant image containing the unique characteristic of each respective image utilizing content-based fusion using a blending coefficient determined from source pixel intensity by defining a pixel value of a display pixel Display1 as follows:

$$Display1 = (ImageA/2^N)*ImageA + (1 - ImageA/2^N)*Display0$$

wherein Display0 is an initial display pixel value, Image A is the respective image from said image source A, and N is a pixel bit depth.

2. A system according to claim 1, wherein at least one of said image sources and display has optical distortion associated therewith, and wherein the model defined by said processor accounts for the optical distortion.

3. A system according to claim 1, wherein for a selected coordinate of the mapping surface within the field of view of a respective image source, said processor using the model determines a coordinate of said respective image source that corresponds to the selected coordinate on the mapping surface, said processor further relates the selected mapping surface coordinate with a corresponding coordinate of the display and displays the image data associated with the determined coordinate of the respective image source at the corresponding coordinate on the display.

4. A system according to claim 1, wherein said processor comprises:

a central processor; and a graphics processor for receiving the collection of vectors from said central processor and for rendering the collection of vectors as a 3D video-textured triangle.

5. A system according to claim 4, wherein at least two of said sources, said display, and said mapping space have a different coordinate system, and wherein said processor calculates transformations for transforming the vectors of said two of said sources, said display, and the mapping space to a primary coordinate system such that the vectors can be correlated.

6. A system according to claim 4, wherein the field of view of a respective image source defines an image projected on the mapping space, wherein said processor defines a tile that is smaller than the image projected on the mapping surface, wherein all texture vectors of the image within the tile are associated with a respective vertex of the mapping surface and all texture vectors projecting on the mapping surface at locations outside the tile are not associated with a vertex of the mapping space.

7. A system according to claim 4 wherein said at least two image sources have respective fields of view that overlap each other on the mapping space, such that said image sources provide respective images having texture vectors that correspond to the same vertex of the mapping space, wherein said processor, for each image source, provides the vertex of the mapping space and the texture vector of respective image source to the graphics processor for display, such that the images from said image sources overlap on said display.

8. A system according to claim 7, wherein said process defines a blending zone representing a plurality of vertices on the mapping surface in a location where the fields of view of said two image sources overlap, wherein for each vertex in the blending zone, said processor alters the intensity value of the vertex color to thereby substantially eliminate a seam between the overlapping tiles.

9. A system according to claim 7, wherein if the images from said at least two image sources have different brightness values, said processor reduces a color magnitude of the vertices of the brighter image located in the blend zone by a scale factor based on a ratio of the relative brightness of the adjacent images at the vertices.

10. A system according to claim 1, wherein said processor defines a mesh of three-dimensional points upon an inner surface of the mapping surface within the field of view of said image sources.

11. A system according to claim 10, wherein said processor maps the three-dimensional mesh points from the mapping surface to said image sources using the model, thereby defining a two-dimensional mesh in the image coordinates of said image sources.

12. A system according to claim 11, wherein said processor uses three-dimensional textured-mesh rendering techniques to create said resultant image from the viewpoint of said display using the three-dimensional mesh points on the mapping surface as vertices, the two-dimensional mesh points of said image sources as texture coordinates, and pixels of the respective images as the texture.

13. A method for providing images of an environment to a display, said method comprising:

providing at least two image sources of different types including a first image source comprising a camera for capturing a visual image and a second image source selected from a group consisting of an infrared source, a radar source and a synthetic vision system, each image source having a field of view and providing an image of the environment;

receiving a selected distance;

defining a mapping surface that is spherical in shape and has a radius equal to the selected distance, wherein the mapping surface approximates the environment within the field of view of the image sources, wherein at least two image sources including image source A have respective fields of view that overlap each other on the mapping surface;

defining a model that relates a geometry of the image sources, a geometry of the display, and a geometry of the mapping surface to each other, wherein the image sources, the display and the mapping surface all have different coordinate systems, and wherein defining the model comprises transforming the image sources, the display, and a mapping surface to a different coordinate system;

mapping different types of images provided by the image sources to the display using the model, wherein mapping comprises combining the respective images having fields of view that overlap each other into a resultant image containing the unique characteristic of each respective image by utilizing content-based fusion using a blending coefficient determined from source pixel intensity by defining a pixel value of a display pixel Display1 as follows:

$$Display1 = (ImageA/2^N)*ImageA + (1 - ImageA/2^N)*Display0$$

wherein Display0 is an initial display pixel value, ImageA is the respective image from said image source A, and N is a pixel bit depth; and displaying the resultant image upon the display in accordance with the model.

14. A method according to claim 13, wherein at least one of the image sources and the display has optical distortion associated therewith, and wherein the model defined in said defining step accounts for the optical distortion.

15. A method according to claim 13, wherein for a selected coordinate of the mapping surface within the field of view of a respective image source, said method further comprising:

using the model to determine a coordinate of the respective image source that corresponds to the selected coordinate on the mapping surface;

relating the selected mapping surface coordinate with a corresponding coordinate of the display; and displaying the image data associated with the determined coordinate of the respective image source at the corresponding coordinate on the display.

16. A method according to claim 13, wherein said mapping comprises defining a mesh of three-dimensional points upon an inner surface of the mapping surface within the field of view of said image sources.

17. A method according to claim 16, wherein said mapping maps the three-dimensional mesh points from the mapping surface to said image sources using the model, thereby defining a two-dimensional mesh in the image coordinates of said image sources.

18. A method according to claim 17 further comprising using three-dimensional textured-mesh rendering techniques to create the resultant image from the viewpoint of the display using the three-dimensional mesh points on the mapping surface as vertices, the two-dimensional mesh points of said image sources as texture coordinates, and pixels of the respective images as the texture.

19. A system for providing images of an environment to a display, said system comprising:

at least two image sources of different types including a first image source comprising a camera for capturing a visual image and a second image source selected from a group consisting of an infrared source, a radar source and a synthetic vision system, each image source having a field of view and providing an image of the environment; and a processor in communication with said image sources and the display, wherein said processor:

receives a selected distance;

defines a mapping surface that is spherical in shape and has a radius equal to the selected distance, wherein the mapping surface approximates the environment within the field of view of said image sources, wherein the field of view of said image sources defines an image projected on the mapping surface at the selected distance, and wherein said processor defines a tile that encompasses only a subset of an area covered by the image projected on the mapping surface by said image sources such that other portions of the image projected on the mapping surface lie outside the tile, wherein said image sources including image source A have respective fields of view that overlap each other on the mapping surface, wherein said processor defines respective tiles for each image such that the tiles having overlapping regions, wherein said image sources provide respective images that each have at least one unique characteristic, and wherein said processor combines the respective images into a resultant image containing these unique characteristic of each respective image by utilizing content-based fusion using a blending coefficient determined from source pixel intensity by defining a pixel value of a display pixel Display1 as follows:

$$Display1 = (ImageA/2^N)*ImageA + (1 - ImageA/2^N)*Display0$$

wherein Display0 is an initial display pixel value, Image A is the respective image from said image source A, and N is a pixel bit depth.

20. A system according to claim 19, wherein said processor defines blend zones on the mapping surface within the overlap regions and modulates the intensity of the respective images in the blend zones to hide seams between the respective images.

21. A method for providing images of an environment to a display, said method comprising:

providing at least two image sources of different types including a first image source comprising a camera for capturing a visual image and a second image source selected from a group consisting of an infrared source, a radar source and a synthetic vision system, each image source having a field of view and providing an image of the environment, wherein said image sources include image source A and provide respective images that each have at least one unique characteristic;

receiving a selected distance;

defining a mapping surface that is spherical in shape and has a radius equal to the selected distance, wherein the mapping surface approximates the environment within the field of view of said image sources, wherein the field of view of said image sources defines an image projected on the mapping surface at the selected distance, wherein said at least two image sources have respective fields of view that overlap each other on the mapping surface, wherein said defining step defines respective tiles for each respective image such that the tiles have overlapping regions;

defining a tile that encompasses only a subset of an area covered by the image projected on the mapping surface by said at least two image sources such that other portions of the image projected on the mapping surface lie outside the tile;

combining the respective images into a resultant image containing the unique characteristic of each respective image by utilizing content-based fusion using a blending coefficient determined from source pixel intensity by defining a pixel value of a display pixel Display1 as follows:

$$Display1 = (ImageA/2^N)*ImageA + (1 - ImageA/2^N)*Display0$$

wherein Display0 is an initial display pixel value, Image A is the respective image from said image source A, and N is a pixel bit depth; and displaying the respective image within the tile on the display.

22. A method according to claim 21 further comprising defining blending zones on the mapping surface within the overlap regions and modulating the intensity of the respective images in the blend zone to hide seams between the respective images.

23. A system for providing images of an environment to a display, said system comprising:

at least two image sources having respective fields of view and providing different types of images of the environment having unique characteristics; and a processor in communication with said image sources and the display, wherein said processor receives a selected distance and defines a mapping surface that is spherical in shape and has a radius equal to the selected distance, wherein the respective fields of view of said image sources including image source A define respective images that project on to the mapping surface at the selected distance and have adjacent regions that overlap, and wherein said processor defines blend zones on the mapping surface within the overlap regions and modulates the intensity of the respective images in the blend zones to hide seams between the respective images, wherein said processor is configured to compare, for each of a plurality of pixels within a blend zone, an intensity of a pixel of one respective image to a predefined maximum intensity to determine an intensity percentage based thereupon, and to blend the corresponding pixels of the respective images based upon the intensity percentage, wherein said processor is configured to map different types of respective images provided by said image sources to the display by combining the respective images having respective fields of view that overlap each other into a resultant image containing the unique characteristic of each respective image by utilizing content-based fusion using a blending coefficient determined from source pixel intensity by defining a pixel value of a display pixel Display1 as follows:

$$Display1 = (ImageA/2^N)*ImageA + (1 - ImageA/2^N)*Display0$$

wherein Display0 is an initial display pixel value, Image A is the respective image from said image source A, and N is a pixel bit depth.

24. A system according to claim 23, wherein for regions of each respective image located in the blend zone, said processor tapers the intensity of the respective image at a point in the respective image at an edge the blend zone to the outer edge of the respective image.

25. A method for providing images of an environment to a display, said method comprising:
   providing at least two image sources having respective fields of view and providing different types of images of the environment having unique characteristics;
   receiving a selected distance;
   defining a mapping surface that is spherical in shape and has a radius equal to the selected distance, wherein the respective fields of view of said image sources including image source A define respective images that project on to the mapping surface at the selected distance and have adjacent regions that overlap;
   defining blend zones on the mapping surface within the overlap regions;
   mapping different types of respective images provided by said image sources to the display by combining the respective images having respective fields of view that overlap each other into a resultant image containing the unique characteristic of each respective image by utilizing content-based fusion using a blending coefficient determined from source pixel intensity by defining a pixel value of a display pixel Display1 as follows:

$$Display1 = (ImageA/2^N) * ImageA + (1 - ImageA/2^N) * Display0$$

wherein Display0 is an initial display pixel value, ImageA is the respective image from said image source A, and N is a pixel bit depth;
   displaying the resultant image on the display; and
   modulating the intensity of the respective images in the blend zones to hide seams between the respective images, wherein modulating the intensity of the respective images comprises comparing, for each of a plurality of pixels within a blend zone, an intensity of a pixel of one respective image to a predefined maximum intensity, determining an intensity percentage based thereupon, and blending the corresponding pixels of the respective images based upon the intensity percentage.

26. A method according to claim 25, wherein for regions of each respective image located in the blend zone, said modulating step tapers the intensity of the image at a point in the respective image at an edge the blend zone to the outer edge of the respective image.

27. A system for providing images of an environment to a display, said system comprising:
   at least two image sources including image source A having respective fields of view that at least partially overlap, wherein said image sources are of different types and provide respective images that each have at least one unique characteristic, wherein said image sources include a first image source comprising a camera for capturing a visual image and a second image source selected from a group consisting of an infrared source, a radar source and a synthetic vision system; and
   a processor in communication with said image sources and the display, wherein said processor receives a selected distance and defines a mapping surface that is spherical in shape and has a radius equal to the selected distance, wherein the respective fields of view of said image sources define respective images that project on to the mapping surface at the selected distance and have regions that overlap, and wherein said processor combines the respective images from the different types of image sources into a resultant image containing the unique characteristic of each respective image by utilizing content-based fusion using a blending coefficient determined from source pixel intensity by defining a pixel value of a display pixel Display1 as follows:

$$Display1 = (ImageA/2^N) * ImageA + (1 - ImageA/2^N) * Display0$$

wherein Display0 is an initial display pixel value, ImageA is the respective image from said image source A, and N is a pixel bit depth.

28. A system according to claim 27, wherein said processor displays one of the respective images with increased intensity relative to the other respective image to thereby enhance the resultant image.

29. A system according to claim 27, wherein said processor evaluates pixels of each respective image and weight pixels based on their associated intensity such that pixels having greater intensity are enhanced in the combined image.

30. A method for providing images of an environment to a display, said method comprising:
   providing at least two image sources including image source A having respective fields of view that at least partially overlap, wherein said image sources are of different types and provide respective images that each have at least one unique characteristic, wherein said image sources include a first image source comprising a camera for capturing a visual image and a second image source selected from a group consisting of an infrared source, a radar source and a synthetic vision system;
   receiving a selected distance;
   defining a mapping surface that is spherical in shape and has a radius equal to the selected distance, wherein the respective fields of view of said image sources define respective images that project on to the mapping surface at the selected distance and have regions that overlap;
   combining the respective images from the different types of image sources into a resultant image containing the unique characteristic of each respective image by utilizing content-based fusion using a blending coefficient determined from source pixel intensity by defining a pixel value of a display pixel Display1 as follows:

$$Display1 = (ImageA/2^N) * ImageA + (1 - ImageA/2^N) * Display0$$

wherein Display0 is an initial display pixel value, ImageA is the respective image from said image source A, and N is a pixel bit depth; and
   displaying the resultant image on the display.

31. A method according to claim 30, wherein said combining step displays one of the respective images with increased intensity relative to the other respective image to thereby enhance the resultant image.

32. A method according to claim 30 further comprising evaluating pixels of each respective image and weighting pixels based on their associated intensity such that pixels having greater intensity are enhanced in the combined image.

* * * * *

UNITED STATES PATENT AND TRADEMARK OFFICE
CERTIFICATE OF CORRECTION

| | | |
|---|---|---|
| PATENT NO. | : 7,619,626 B2 | Page 1 of 1 |
| APPLICATION NO. | : 10/379409 | |
| DATED | : November 17, 2009 | |
| INVENTOR(S) | : Kenneth L. Bernier | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 143 days.

Signed and Sealed this

Twenty-sixth Day of October, 2010

David J. Kappos
*Director of the United States Patent and Trademark Office*